US008388433B2

(12) United States Patent
Stewart et al.

(10) Patent No.: US 8,388,433 B2
(45) **Date of Patent: *Mar. 5, 2013**

(54) SLOT MACHINE SYSTEMS, METHODS, AND APPARATUS

(75) Inventors: Scott Stewart, Las Vegas, NV (US); Anthony Wayne Bond, Las Vegas, NV (US); Casey Lyle Condron, Las Vegas, NV (US); Lonnie Lynn Anderson, Las Vegas, NV (US); Charles Gilbert Mull, Jr., Las Vegas, NV (US); Steve Lewandowski, Pahrump, NV (US); Linn Anthony McKay, Las Vegas, NV (US); Michael Bristol, Las Vegas, NV (US)

(73) Assignee: Aristocrat Technologies Australia Pty, Ltd. (AU)

( * ) Notice: Subject to any disclaimer, the term of this patent is extended or adjusted under 35 U.S.C. 154(b) by 668 days.

This patent is subject to a terminal disclaimer.

(21) Appl. No.: 12/193,275

(22) Filed: Aug. 18, 2008

(65) Prior Publication Data

US 2010/0041460 A1 Feb. 18, 2010

Related U.S. Application Data

(63) Continuation of application No. PCT/IB2007/053939, filed on Sep. 27, 2007, and a continuation of application No. 11/833,156, filed on Aug. 2, 2007.

(60) Provisional application No. 60/834,329, filed on Jul. 29, 2006.

(51) Int. Cl.
*A63F 13/00* (2006.01)

(52) U.S. Cl. .......................................... 463/20; 273/292

(58) Field of Classification Search ............... 463/20–30
See application file for complete search history.

(56) References Cited

U.S. PATENT DOCUMENTS

| | | | |
|---|---|---|---|
| 3,757,101 | A | 9/1973 | Semotan |
| 4,711,451 | A | 12/1987 | Patak et al. |
| 4,751,422 | A | 6/1988 | Moianz et al. |
| 4,858,932 | A | 8/1989 | Keane |
| 4,889,339 | A | 12/1989 | Okada |

(Continued)

FOREIGN PATENT DOCUMENTS

| | | | |
|---|---|---|---|
| EP | 1260928 | A2 | 11/2002 |
| EP | 1531436 | A2 | 5/2005 |

(Continued)

OTHER PUBLICATIONS

International Search Report corresponding to International Application Serial No. PCT/US2007/075202, mailed Jun. 4, 2008, 2 pages.

(Continued)

*Primary Examiner* — Masud Ahmed

(74) *Attorney, Agent, or Firm* — McAndrews, Held & Malloy, Ltd.

(57) ABSTRACT

Systems, methods and/or apparatus for slot machine eyestrain reduction are disclosed. Systems, methods and/or apparatus for slot machine back lighting are further provided. Systems, methods and/or apparatus for a slot machine back lighting effect are also disclosed. Systems, methods and/or apparatus for reel line lights are disclosed. Systems, methods and/or apparatus for reel tilt and motion detection are disclosed. Systems, methods and/or apparatus for reel wins display for an electromechanical slot machine and/or gaming machine viewing window configurable lines are disclosed. Systems, methods and/or apparatus for a configurable shelf system for an electromechanical slot machine are disclosed. Systems, methods, and apparatus are also disclosed for reel tilt minimization. Systems, methods and/or apparatus for slot machine controlled lighting. Further embodiments of the present disclosure can provide slot machine reel stop systems, methods, and apparatus useful for electromechanical slot machines.

11 Claims, 26 Drawing Sheets

U.S. PATENT DOCUMENTS

| | | | | |
|---|---|---|---|---|
| 5,184,881 | A | 2/1993 | Karpen | |
| 6,019,476 | A | 2/2000 | Kirschner | |
| 6,394,900 | B1 * | 5/2002 | McGlone et al. | 463/20 |
| 7,887,408 | B2 | 2/2011 | Walker et al. | |
| 2001/0031658 | A1 | 10/2001 | Ozaki et al. | |
| 2003/0157980 | A1 | 8/2003 | Loose et al. | |
| 2004/0053699 | A1 | 3/2004 | Rasmussen et al. | |
| 2004/0150162 | A1 * | 8/2004 | Okada | 273/292 |
| 2005/0288090 | A1 * | 12/2005 | Thomas et al. | 463/20 |
| 2008/0113736 | A1 * | 5/2008 | Shackelford et al. | 463/20 |
| 2008/0113738 | A1 * | 5/2008 | Vallejo et al. | 463/20 |
| 2008/0146317 | A1 * | 6/2008 | Kromydas | 463/20 |

FOREIGN PATENT DOCUMENTS

| | | | | |
|---|---|---|---|---|
| EP | 1557803 | A2 | | 7/2005 |
| GB | 2165387 | A | * | 4/1986 |
| GB | 2 200 779 | A | | 8/1988 |
| GB | 2356483 | A | | 5/2001 |
| GB | 2365191 | A | * | 2/2002 |

OTHER PUBLICATIONS

Written Opinion of the International Searching Authority corresponding to International Application Serial No. PCT/US2007/075202, mailed Jun. 4, 2008, 2 pages.

International Search Report and Written Opinion corresponding to International Application No. PCT/IB2007053939, mailed Nov. 17, 2008, 20 pages.

International Preliminary Report on Patentability for Internatinal Patent Application No. PCT/US2007/075202, mailed Feb. 11, 2010.

L297 stepper motor controller datasheet, dated Dec. 2001, downloaded from http://www.st.com/stonline/books/pdf/docs/1334.pdf, Jan. 30th, 2010.

Application note AN235/0788 discussing stepper motor driving, dated 1995, downloaded from http://www.st.com/stonline/books/pdf/docs/1679.pdf, Jan. 30th, 2010.

2003-2004 Oriental Motor stepper motor datasheets, downloaded from http://stevenengineering.comITech_Support/PDFs/50VEXTASTEP.pdf, Jan. 30th, 2010.

* cited by examiner

2700

| | 0 | 1 | 2 | 3 |
|---|---|---|---|---|
| 0 | 99 | +1 | -1 | 99 |
| 1 | -1 | 99 | 99 | +1 |
| 2 | +1 | 99 | 99 | -1 |
| 3 | 99 | -1 | +1 | 99 |

2702

2704

SLOT MACHINE SYSTEMS, METHODS, AND APPARATUS

RELATED APPLICATIONS

This application is a continuation of and claims priority to International Application No. PCT/2007/053939, having an international filing date of Sep. 27, 2007 which obtained the right to restore priority for request for rectification, and which claims priority benefits to U.S. Provisional Patent Application No. 60/834,329, filed Jul. 29, 2006, entitled "A Gaming Machine," which is hereby incorporated by reference herein in its entirety. In addition, this application is a continuation of U.S. patent application Ser. No. 11/833,156 filed Aug. 2, 2007.

BACKGROUND OF THE INVENTION

The present disclosure relates to slot machines, including electromechanical slot machines employing variations of poker games, and which will be referred to hereinafter by the general term "gaming machines" or "slot machines."

Slot machines, including gaming machines based on variations of different types of poker games, have become popular in the United States and in many other countries throughout the world.

Traditional electromechanical slot machines have made use of spinning reels, usually controlled by stepper motors, to provide a display function. Symbols carried on the reels are typically aligned to produce a game result which may, or may not be, a winning combination. Such machines have typically paid a prize only on a center row combination, however, over the years more complex pay arrangements have been developed in which winning combinations could appear on horizontal lines above and below the center row line.

Players who regularly play gaming machines can quickly lose interest in the particular games used. Manufacturers of such gaming machines therefore seek to develop innovative game features that add interest to the games provided on such machines, or to provide new games in order to keep players amused and willing to continue playing gaming machines.

Recently the gaming machine market has experienced considerable growth and there is intense competition between manufacturers of gaming machines to supply the various existing and new gaming venues that are newly established. The revenue raised by an operator of a particular gaming venue depends to a large degree on the amount of money wagered on such gaming machines. In turn, the amount of money wagered on a particular gaming machine is related to the popularity of the machine. Thus, when selecting a supply of gaming machines, the popularity of the various machines is a main consideration.

Previously, with a gaming machine having spinning reels controlled by stepper motors, there have been physical limits to the amount game features that were added to the gaming machine. This limitation of game features correspondingly reduced the long-term interest in the particular game.

The available size of the game jackpot has been recognized as a further limitation on such gaming machines. The jackpot available on a particular gaming machine depends to a degree on the probability of a particular winning line occurring. The probability of a winning betting line occurring, in turn, depends on the number of symbols on the reels. By way of example, for a gaming machine having the traditional three reels, if each reel carried only ten symbols, and a particular winning symbol appeared once only on each reel, the probability of the reels aligning the three particular winning symbols on the pay line would be one in a thousand.

Thus on a machine which merely broke even, and only paid a jackpot for the combination of those three winning symbols, a jackpot of 1000 credits could be offered for a one credit wager. Of course, usually, other combinations of symbols also pay prizes and on average gaining machines retain a proportion of monies wagered. Hence, on such a machine the jackpot prize payable would be much smaller than 1000 credits.

One solution to this problem is to increase either the number of reels, or the size of the reels and the number of symbols on a particular reel. However, there is obviously a physical limit to the size and number of reels which can be provided, governed by the size of the standard gaming machine cabinet, the costs involved in making oversize machines, and the reluctance of gaming machine operators to have oversized gaming machines in their venues.

Consequently there is a tendency for the use of video displays simulating spinning reels since this allows, among other things, the use of virtual reels which can be of almost infinite size, and also enables the provision of animation and other innovative game features provided by suitable control of the video display means, to increase player interest.

Many players of gaming machines prefer, however, the traditional spinning style gaming machines where they can see a physical reel spinning and believe that such machines are inherently more trustworthy and honest. Players have shown a distrust of video simulations of gaming machines and believe that they might have a poor chance of winning on such machines. They may further believe that there is more scope for winning on the traditional style machines by the exercise of their skill and experience in playing such gaming machines.

FIG. 1 is a perspective view representing a prior art spinning reel type poker machine, as shown as described in U.S. Pat. No. 6,056,642, which is incorporated herein in its entirety by reference. The slot machine 10 shown includes a plurality (in this case three) of rotatable reels 12 carrying symbols 14 is arranged to pay a variable prize on the occurrence of a predetermined symbol or combination of symbols on a win line.

In the slot machine 10 illustrated in FIG. 1, the game is initiated by a pull handle 16, or an operating mechanism such as a push button actuator or other initiation device in other embodiments of the disclosure. The top box 18 on top of the slot machine 10 can include a display 20 which illustrates the various winning combinations for which a price is paid.

The payment or not of a jackpot prize is determined by the occurrence of winning numbers, e.g., three 7's, on the win or betting line as shown in FIG. 1. As shown, the winning numbers are against a clear background. For the machine of FIG. 1, when the winning numbers appear on the display, the display color may change. If, for example, the three 7's all change to a red color, the jackpot prize would be paid, otherwise a lesser prize associated with three 7's of that particular color or color mix would be paid. The coloring of the 7's occurs by backlighting the 7s in the reels by means of colored light bulbs or similar means. This display is shown at 22 on FIG. 1.

As shown in FIG. 1, the presence of the above feature on a gaming machine allows that gaming machine to pay a jackpot which is several times greater than would normally be paid. For example if each 7 has an equal chance of becoming white, blue or red, then the chance of all three reels turning red is 1 in 27 and therefore a jackpot prize of approximately 27 times greater than an identical gaining machine without the feature of the present disclosure can be paid. Thus the present disclosure increases the attractiveness of a gaming machine to a player.

FIG. 2 is a perspective view representing a prior art gaming machine having a video display simulating one or more spinning reels. Slot machine 50 is a video version of the, machine of FIG. 1 and includes a video screen 52 on which five spinning reels 54 are simulated, each of the spinning reels having a plurality of symbols 56 similar to the physical symbols in the embodiment of FIG. 1.

The machine shown in FIG. 2 may also be configured to run a keno, bingo or card game, in which on the occurrence of particular combinations of symbols, a color change to the symbols (or their background) occurs and depending on the change an additional prize may be paid.

FIG. 3 is a schematic diagram of a prior art game control means of FIG. 2. The program to implement the game runs on a standard gaming machine control processor 31 as illustrated schematically in FIG. 3. This processor forms part of a controller 30 which drives the display screen 11 and receives touch input signals from touch sensors 32 as well as receiving coin input pulses from a coin chute mechanism 33 and driving a coin payout mechanism 34.

While the slot machines and apparatus shown and described for FIG. 1-3 are suitable for their intended purpose(s), certain disadvantages have been present in other types of prior art slot machines. For example limitations have been identified for prior art gaming machines including an inability to captivate gamblers, poor lighting, lack of interchangeability or reconfiguration among components, and/or issues with electromechanical reel movement including sensitivity or vulnerability to inadvertent or intentional movement of the machine and/or reels.

For example, with slot machines reels, wheels, or other motors, it is critical to both detect illegal motion (being moved when they shouldn't be) and to accurately determine where the motor/reel/wheel is while during operation. Certain techniques have been used previously to try to accurately locate the wheels/reels in operation.

Slot machines are required, e.g., by gaming authorities or casino owners, to constantly monitor their reels and wheels for tampering, and to report such tampering to the monitoring system. The software that drives and monitors the reels is designed in such a way as to always detect "illegal motion".

FIG. 4 is a side view of prior art slot machine reel 40 with motion detection system according to the prior art. The system includes a circular frame 42 and an optical sensor 44. A position marker (home indication) 46 is affixed to the reel 40. The sensor operates to detect the movement of the position marker 46 as the marker 46 passes in proximity to the sensor as the reel 40 moves. FIG. 5 is a close-up of the prior art sensor of FIG. 4, showing further detail of the optical sensor 44, frame 42, and position marker 46. FIG. 6 is a close of the prior art sensor of FIG. 4 from a different perspective.

Prior art techniques (e.g., as shown in FIGS. 4-6) have sometimes included a shaft mounted single or dual encoder system to determine position of a rotatable slot machine reel. Additional techniques have included two encoders mounted on a particular wheel drum, with one encoder for location/motion detection and the other for home position detection. Such systems have, however, been shown to have limitations including an inability/poor capability to detection the direction of motion of the associated reel(s).

Further limitations of prior art electromechanical slot machines have been recognized for electromechanical machines that have used back-lit mechanical reels. Such slot machines typically flash each symbol in sequence and then show or flash all symbols in the pay. Such prior art systems may have included identifying winning lines but not winning information associated with a winning line. Additionally, the symbols/designs on mechanical reels can be difficult to view under various lighting conditions and problems with viewing can still exist observing the lines or reels purchased information. Also problems occur in prior art slot machines because typical front lighting only illuminates the reels of a stepper-motor based slot machine, and because back lighting is typically turned on after an individual reel/wheel stops moving.

Visual problems with spinning wheels/reels used in prior art slot machines have included low brightness and/or attractiveness. In an attempt to remedy such problems, slot machine manufacturers have employed certain back-lit mechanical reels but none illuminate them during the spin. Players of slot machines spend most of their time staring at the reel glass area, to see both the spinning reels (to see where they stop) and the slot display (to see the meters and messages). The reels themselves are typically illuminated from the top (and/or bottom) by the same light that illuminates the reel glass itself, typically a fluorescent lamp (or lamps) behind the glass. This arrangement can produce excessive glare for players of the slot machine. Further disadvantages of prior art slot machines have been identified relating to retaining user interest relative to lighting a portion of the a slot machine with a single color (spectrum distribution) of light.

In addition to the lighting and reel motion limitations of prior art slot machines as noted above, prior art slot machines have had limitations regarding interchangeability and/or reconfigurability of system components, which among other things has been limiting for the cost-effectiveness of and long-term user interest in such games. For example, prior art slot machines have typically employed different reel glass to display different lines. Typically prior art mechanical three-reel slot machines typically have used one payline on the center of the reel glass, with some games including three lines or five lines. These lines are all displayed as a line on the reel glass. Newer games can have an increased amount of lines, e.g., 9, 12, 12, 20, or more lines. The only current method is to change the art on the reel glass for each type. As a further example of such limitations, in prior art mechanical slot machines, a new cabinet design is used for each type of slot machine, e.g., a 3-reel, 4-reel, 5-reel machine.

Accordingly, it would be desirable to alleviate the disadvantages of the prior art slot machines and related systems and methods, including as described above, and to provide improved game methods, systems, and apparatus for slot gaming machines.

BRIEF SUMMARY OF THE INVENTION

Aspects of the present disclosure are directed to systems, methods, and apparatus that address the shortcomings and problems noted previously.

An aspect of the present disclosure can provide systems, methods and/or apparatus for slot machine eye-strain reduction. An exemplary system can include one or more light sources configured and arranged to illuminate one or more rotatable reels of an electromechanical slot machine, and a filter disposed between the one or more light sources and the one or more rotatable reels. An embodiment of an electromechanical slot machine may include one or more rotatable reels rotatably disposed in a housing, a stepper motor configured and arranged to spin the one or more rotatable reels, and a light source configured and arranged to illuminate one or more rotatable reels. As noted above, a filter may be disposed between the light source and the plurality of reels, with the filter being configured and arranged to filter the light produced by the light source to simulate natural daylight illuminating the one or more reels. Eye-straining effects of the light source can consequently be reduced.

A further aspect of the present disclosure can provide systems, methods and/or apparatus for slot machine back lighting. An exemplary slot machine can include a plurality rotatable reels rotatably supported in a cabinet, wherein game symbols are disposed on an outer surface of each real. A motor, such as a stepper motor, may be supported in the cabinet and configured and arranged to rotate each reel. A plurality of controlled light sources can be included, with at least one light source located behind a visible surface of each real, wherein each light source is configured and arranged for activation to illuminate one or more desired symbols on the reel. A related method of providing back lighting to a slot machine can include placing one or more controlled light sources behind a user viewable position of a plurality of mechanical rotatable slot machine reels. One or more of the controlled light sources can be activated, and one or more desired game symbols on the plurality of slot machine reels can be highlighted.

A further aspect of the present disclosure can provide systems, methods and/or apparatus for a slot machine back lighting effect. An exemplary slot machine can include at least one rotatable reel with game symbols. A motor, for example a stepper motor; can be present to rotate the at least one rotatable mechanical reel with having game symbols. The slot machine can include a plurality of light sources, at least one light source being disposed to illuminate each reel, with the plurality of light sources being configured and arranged for activation and deactivation interchangeably based on a pre-specified duty cycle when a reel is rotating for creating a flickering effect when observed by a slot machine player. A related method of illuminating a slot machine can include providing at least one rotatable reel with game symbols. A motor for rotating the at least one rotatable mechanical reels can be operated. A plurality of light sources can be operated, with at least one light source being disposed to illuminate each reel. The plurality of light sources can be configured and arranged for activation and deactivation interchangeably based on a pre-specified duty cycle when a reel is rotating for creating a flickering effect when observed by a slot machine player.

A further aspect of the present disclosure can provide systems, methods and/or apparatus for reel line lights. An exemplary slot machine can include a plurality of rotatable reels having game symbols. One or more motors, such as stepper motors, can be configured and arranged to rotate the one or more reels. One or more light sources can be disposed behind a player observable surface of the reels. The player observable surface can correspond to a portion or a selectable betting pattern of the reels, with each light source being configured and arranged to be selectively activated to identify a betting pattern that a player has selected. A related method of operating an electromechanical slot machine can include selecting a betting pattern for an electromechanical slot machine having a plurality of rotatable reels. One or more light sources disposed behind a player observable surface of the one or more reels can be selectively activated for identifying the betting pattern with the activation of the light sources.

A further aspect of the present disclosure can provide systems, methods and/or apparatus for reel motion detection. An exemplary system can include a plurality of circular circumferentially configured position markers (encoding patterns) disposed on a rotatable reel of a slot machine. One or more sensors can be present with each sensor being configured and arrange to detect movement of one of the plurality of circumferentially configured position markers and produce a corresponding signal corresponding to movement of the position marker/encoding pattern relative to the associated sensor. The position markers and sensors can function together as location/motion detection encoders. Two such encoders can produce staggered waveforms that can be used to detect rotation and direction of rotation or the associated reel as well as position of the reel. A related method of detecting motion of a slot machine reel can include providing a rotatable slot machine reel with two or more encoders for a rotatable slot machine reel. The encoders can each be configured and arranged to produce an output signal, e.g., digital waveform, based on movement of associated reel. Each encoder can be provided with an encoding pattern/position marker that includes a plurality of encoding elements, e.g., rectangular plates, disposed along the path of motion of an associated slot machine reel. Each encoding pattern can be positioned at a different position than each other encoding pattern, e.g., in a different angular position relative to the center of rotation of the associated reel. One or more output signals, e.g., waveforms, from each encoders can be detected. The waveforms can be sent/used for control and/or position monitoring. The sensors can be suitable optical sensors including an optical source and detector.

A further aspect can provide systems, methods and/or apparatus for reel wins display for an electromechanical slot machine. An exemplary method can include displaying a first winning combination for a slot machine; and displaying prize information associated with the first winning combination. Displaying a winning combination can include operating a light source disposed behind a rotatable reel display area of a slot machine reel relative to a slot machine user. Further winning combinations may also be displayed, optionally with associated prize information. A related system for displaying reel wins for a slot machine can include a ‘plurality of light sources configured and arranged to indicate a winning combination of positions on a plurality of rotatable reels. The system can include a display for indicating prize information corresponding to the winning combination.

A further aspect can include systems, methods and/or apparatus for gaming machine viewing window configurable lines. A exemplary system can include a first area having pictorial patterns, and a second are configured to interchangeably receive an insert. An insert may be included and may be configured for reception by the second area, with the insert being configurable to identify pay lines or available bet patterns associated with a gaming machine. A related method of presenting information associated with a slot machine to a user can include providing a slot machine viewing window with a first area having pictorial patterns. The slot machine can be provided with a slot machine window with a second area configured to interchangeably receive an insert. The slot machine window can be provided with an insert configured for reception by the second area, with the insert being configurable to identify pay lines or available bet patterns associated with a gaming machine.

A further aspect can include systems, methods and/or apparatus for a configurable shelf system for an electromechanical slot machine. An exemplary shelf system can include a shelf including a plurality of hole pairs and a flange, with the flange including a plurality of apertures. One or more fasteners, e.g., fastener pairs, can be included. For example, a fastener pair can correspond to a hole pair, with each fastener pair being configured and arranged to secure a rotatable slot machine reel to the shelf. One or more connectors can be included, with each connector being configured and arranged to provide an electrical connection for a rotatable slot machine reel. Each connector can be disposed through an aperture in the flange. A related method of providing a configurable shelf for a slot machine can include providing a shelf including a plurality of hole pairs and a flange, with the flange including a plurality of apertures. The one or more rotatable slot machine reels can be secured to the shelf, for example, with each reel being secured with a fastener pair that corresponds to a hole pair. One or more connectors can be included, with each connector being configured and arranged to provide an electrical connection for controlling the operation of a rotatable slot machine reel. Each connector may be disposed through an aperture in the flange.

A further aspect can include systems, methods and/or apparatus for slot machine reel tilt minimization. An exemplary system for an electromechanical slot machine can include one or more rotatable slot machine reels rotatably disposed in a cabinet including a door configured and arranged to open and close. Data recording means (e.g., a suitable type of data logger or other data acquisition device) can be included for recording tilt events corresponding to movement of each rotatable reel and/or indicating tilt event data corresponding to movement of each reel. A controller may be present and may be configured and arranged to control rotation of the one or more rotatable slot machine reels. The controller can be configured and arranged to disable the data recording means when the slot machine door is open. A related method of detecting motion of a slot machine can include detecting movement of a rotatable reel of an electromechanical slot machine. Tilt/motion event data that corresponds to the reel movement may be sent to a monitoring/control system. In response to a door of the slot machine being in an open position, the sending/transmission of event/motion data to the monitoring/control system can be suspended or stopped.

A further aspect can include systems, methods and/or apparatus for slot machine controlled lighting. An exemplary lighting system for an electromechanical slot machine can include a plurality of light sources, with groups of two or more light sources being configured and arranged to illuminate a desired area of an electromechanical slot machine display with light of a different color in response to a specific event occurring during the operation of the slot machine. A related electromechanical slot machine can include a plurality of rotatable reels. The slot machine can include one or more stepper motors, each motor being configured and arranged to rotate a rotatable reel. A plurality of light sources may be included, with groups of two or more light sources being configured and arranged to illuminate an area of an electromechanical slot machine display with light of a different color. The groups of light sources may be configured and arranged to illuminate a respective area of the display in response to a specific event occurring during the operation of the slot machine. A related method of controlling lighting for an electromechanical slot machine can include providing an electromechanical slot machine with a plurality of light sources are configured and arranged to emit light in response to a specific event occurring during the operation of an electromechanical slot machine. The colors of light emitted from a source location of the display can be controllably changed or altered in response to a specific event associated with operation of the slot machine.

BRIEF DESCRIPTION OF SEVERAL VIEWS OF THE DRAWINGS

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

Figure 1:
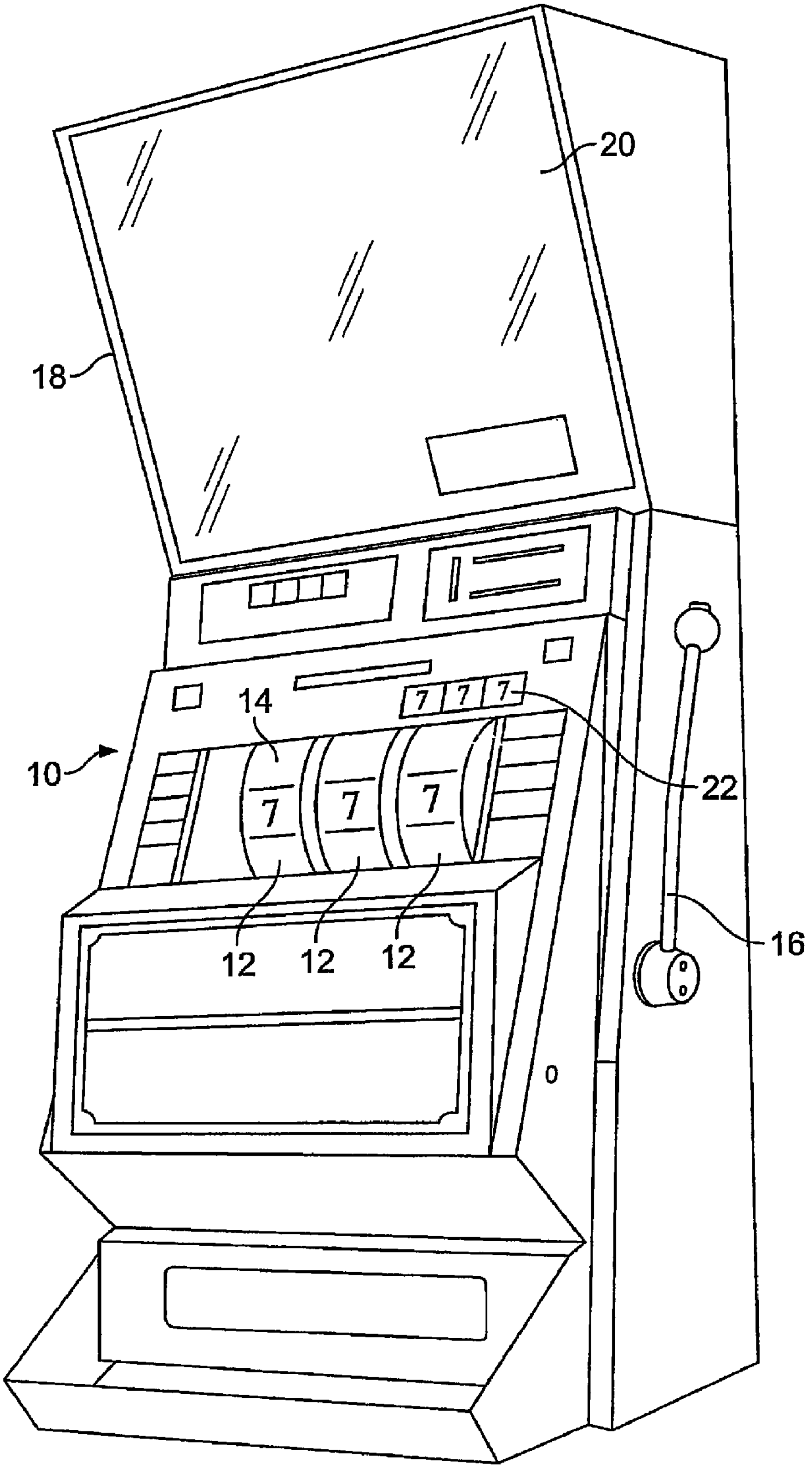
FIG. 1 (Prior Art)
FIG. 1 is a perspective view representing a prior art spinning reel type poker machine.
Figure 2:
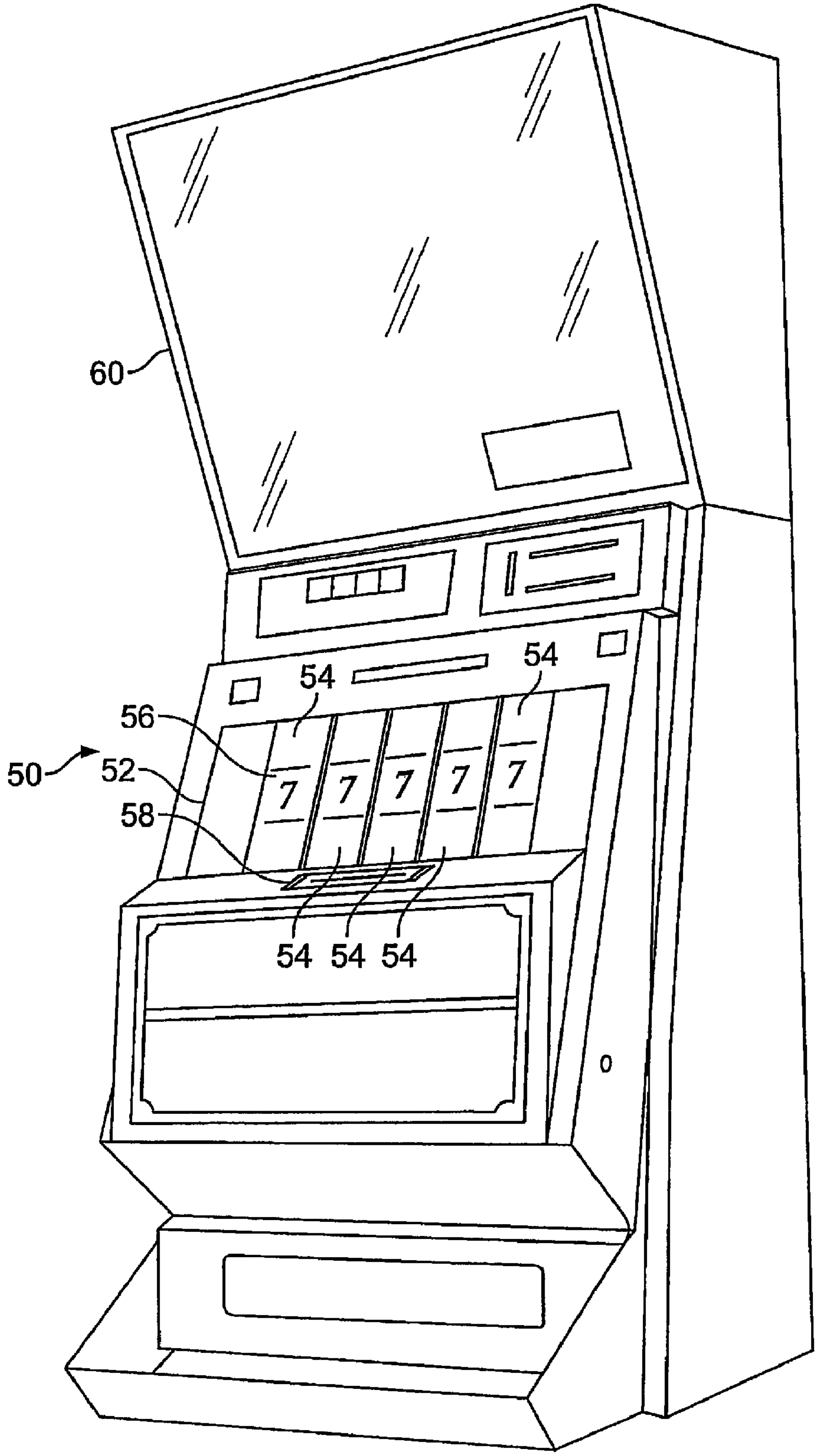
FIG. 2 (Prior Art)
FIG. 2 is a perspective view representing a prior art gaming machine having a video display simulating one or more spinning reels.
Figure 3:
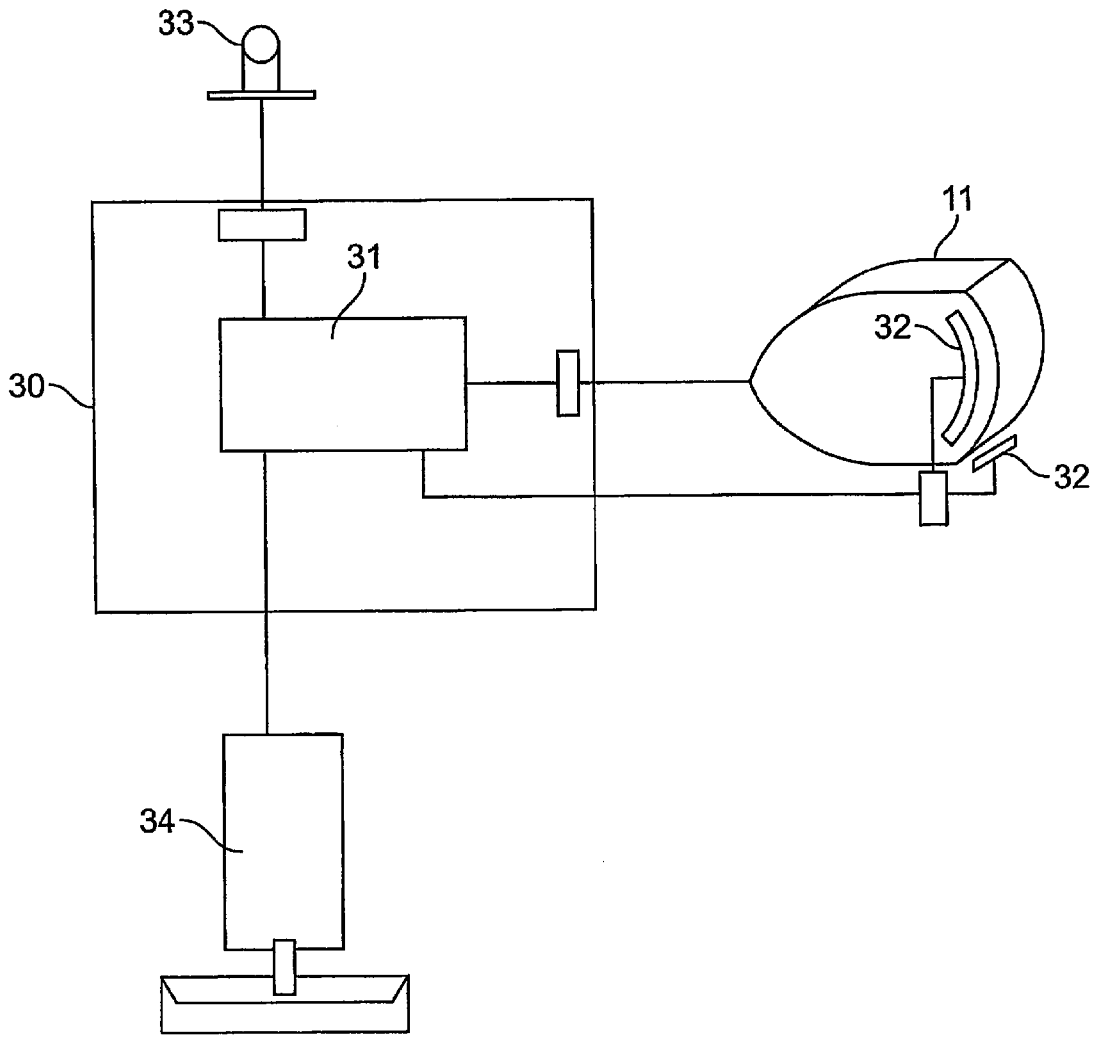
FIG. 3 (Prior Art)
FIG. 3 is a schematic diagram of a game control means of FIG. 2.
Figure 4:
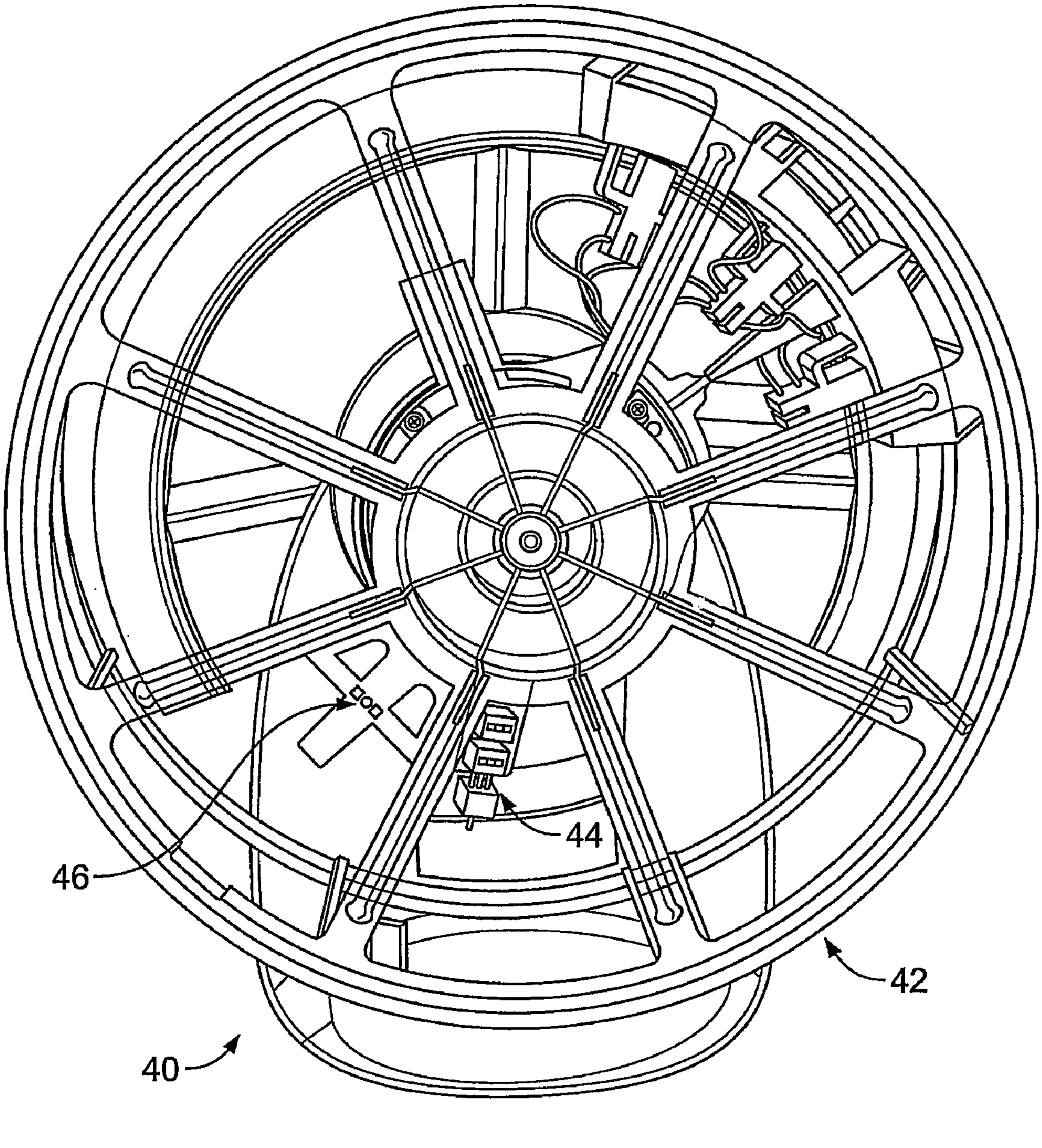
FIG. 4 (Prior Art)
FIG. 4 is a side view of prior art slot machine reel with optical sensor.
Figure 5:
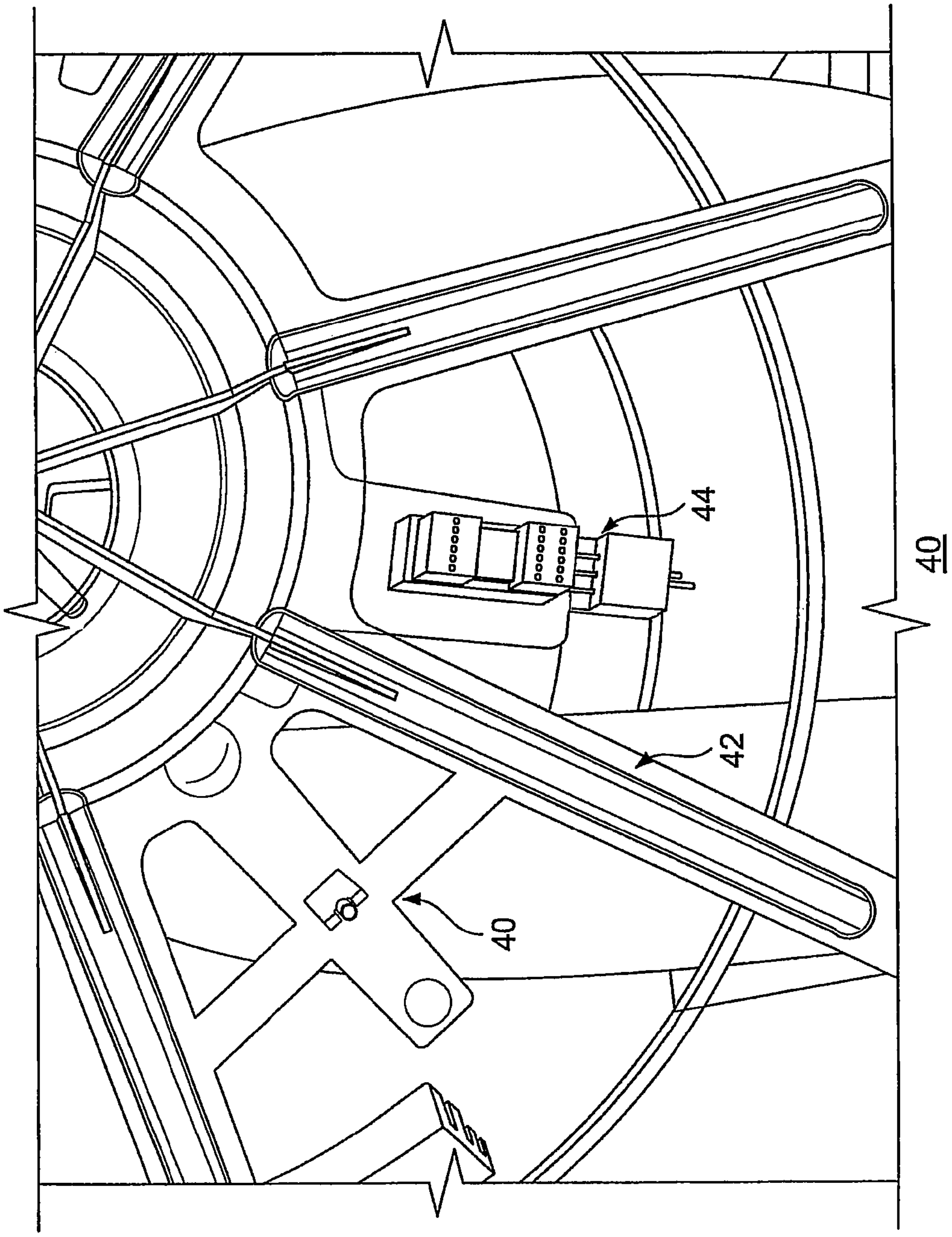
FIG. 5 (Prior Art)
FIG. 5 is a close-up of the prior art sensor of FIG. 4, showing the optical sensor.
Figure 6:
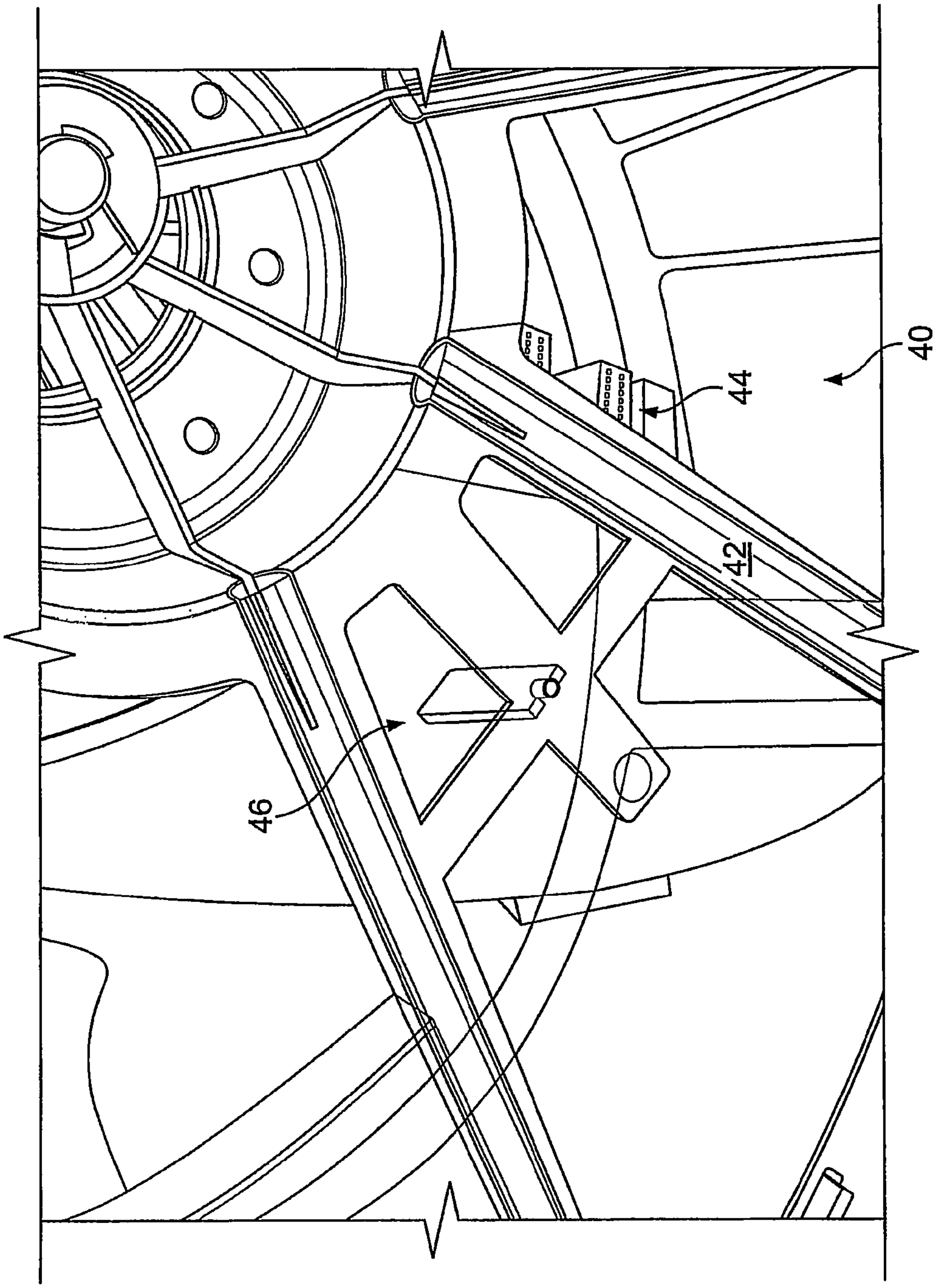
FIG. 6 (Prior Art)
FIG. 6 is a close of the prior art sensor of FIG. 4 showing the reel position marker.

It should be understood by one skilled in the art that the embodiments depicted in the drawings are illustrative and variations of those shown as well as other embodiments described herein may be envisioned and practiced within the scope of the disclosure.

DETAILED DESCRIPTION OF THE INVENTION

Aspects of the present disclosure present systems, methods, and apparatus useful for electromechanical slot machines.

Figure 7:
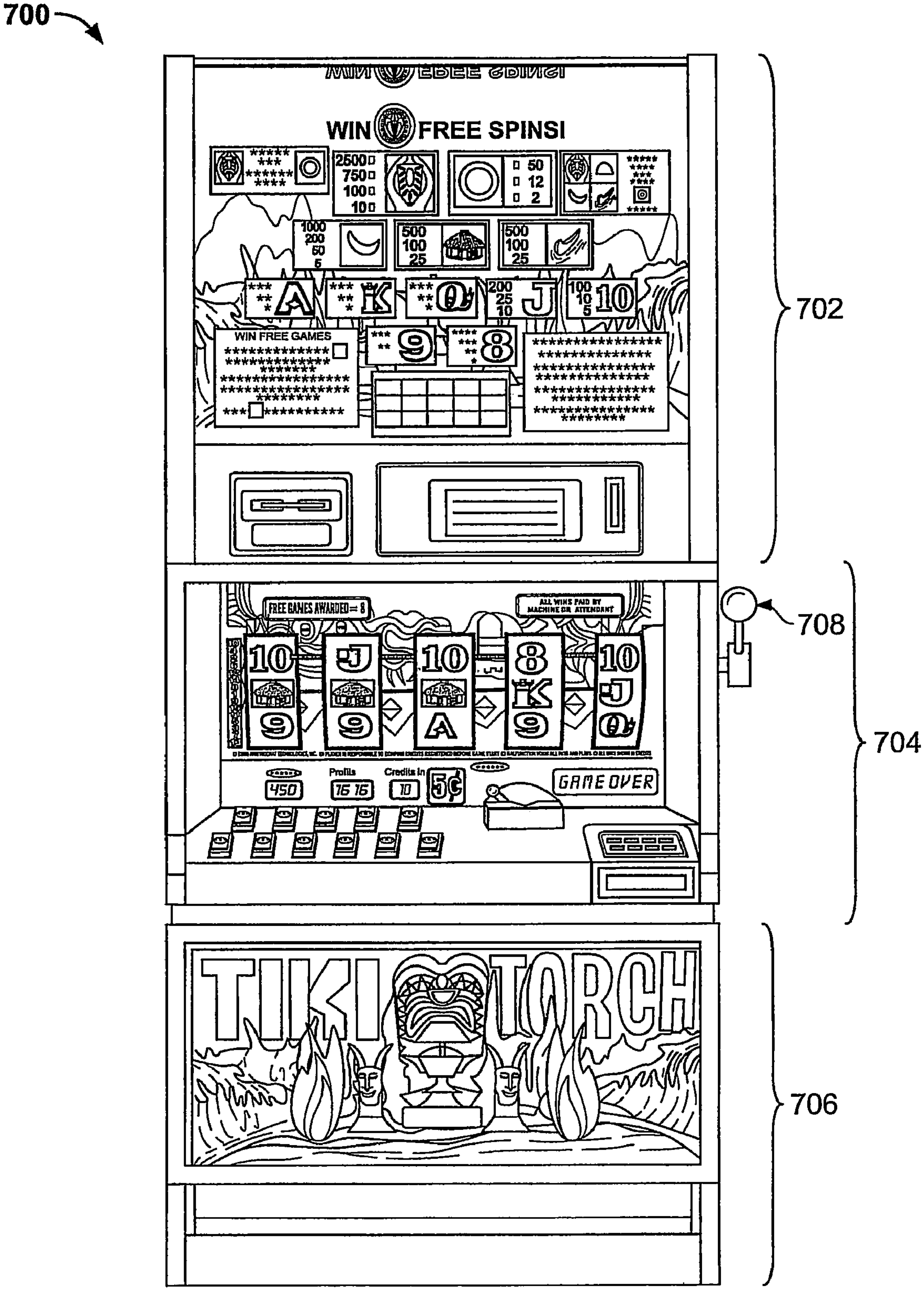
FIG. 7 is a front view of an exemplary embodiment of a slot machine according to the present disclosure.

FIG. 7 is a front view of an exemplary embodiment of a slot machine 700 according to the present disclosure. The slot machine 700 includes an upper portion 702 having information related to winning combinations. A middle portion 704 of the machine 700 includes a viewing window, rotatable reels with game symbols, and user control, e.g., selectable buttons and a game lever 708 for betting. The machine 700 includes a lower portion 706, which can include desired artwork, advertising, etc.

Figure 8:
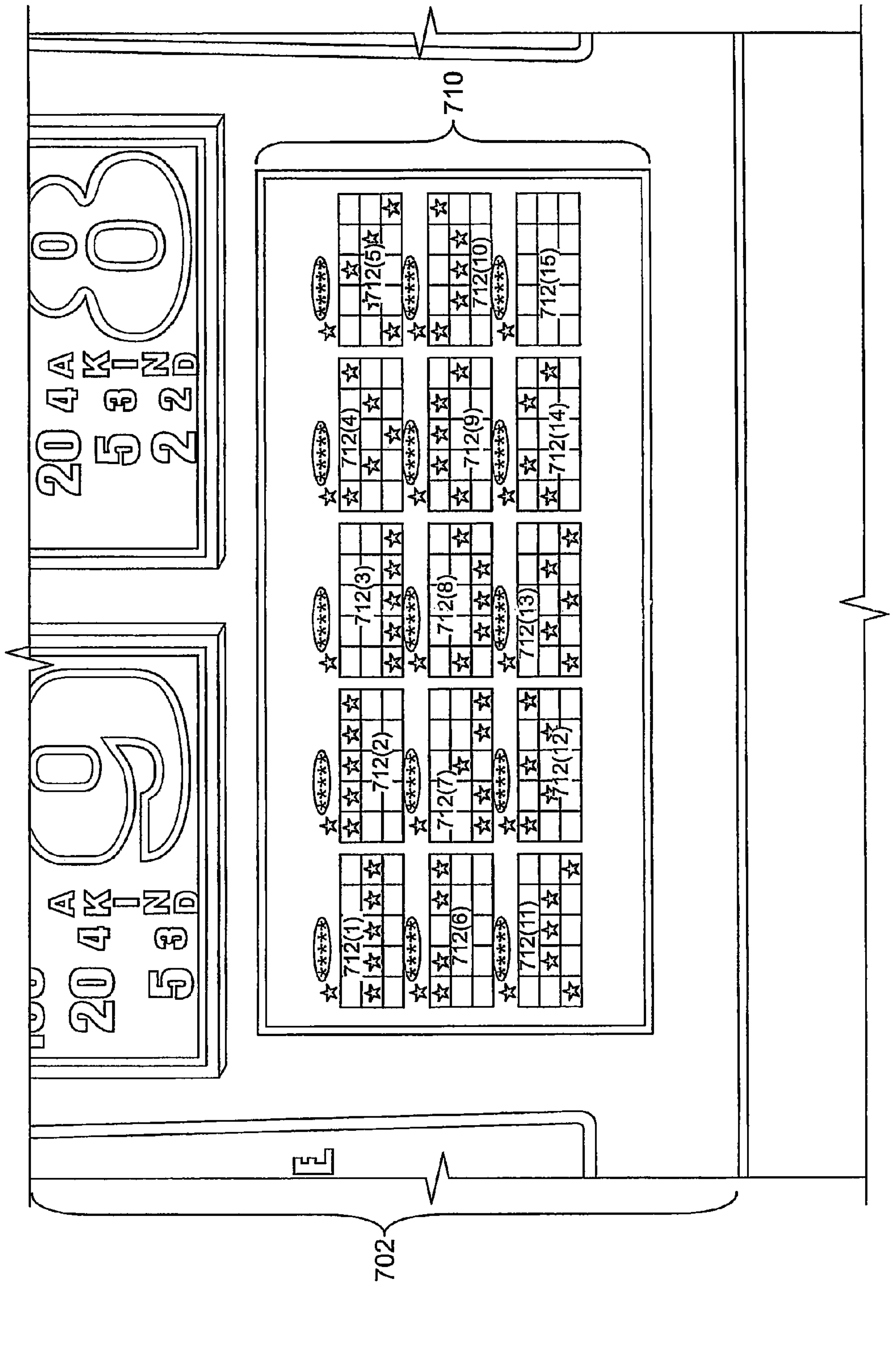
FIG. 8 is an enlarged view of the upper portion of the slot machine of FIG. 7.

FIG. 8 is an enlarged view of the upper portion 702 of the slot machine 700 of FIG. 7. As shown, display 710 can include available betting patterns 712(1)-712(15) associated with the slot machine 700. The number and configuration of the available betting patterns 712(1)-712(15) can be configured as desired.

Figure 9:
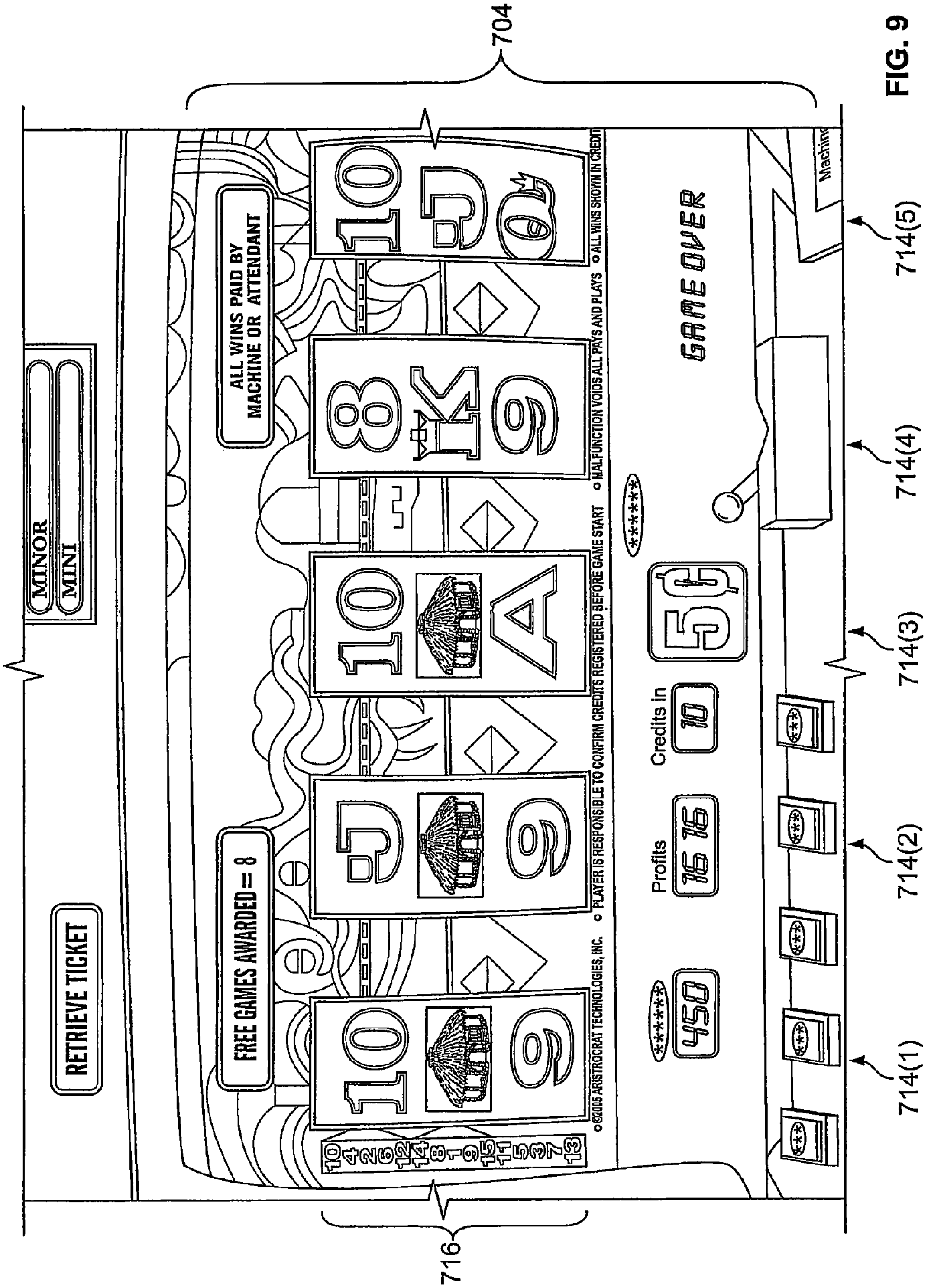
FIG. 9 is an enlarged view of the middle portion of the slot machine of FIG. 7.

FIG. 9 is an enlarged view of the middle portion 704 of the slot machine 700 of FIG. 7. As shown in FIG. 9, middle portion 704 can include a number of rotatable reels 714(1)-714(5). Middle portion 704 may also include a pay line display 716 (shown as a vertical strip on left side of the figure) that includes numbers corresponding to the a pay line selected and bet by a player.

One or more suitable light sources may be located or disposed within or on the slot machine 700 to facilitate viewing of the pay line display. For example, suitable light emitting diodes may be located behind the player observable surface shown in FIG. 9. One or more suitable light sources may also be located or disposed within/on the slot machine to facilitate viewing of the reels.

Embodiments of the present disclosure can provide eye strain reduction for slot machines. In exemplary embodiments, one or more filters (not shown) may be present to filter the light from the light sources, e.g., to mimic or simulate the spectral distribution of natural daylight. For example, one or more filters as described in U.S. Pat. No. 6,019,476, which is incorporated herein in its entirety by reference, may be used to filter fluorescent light sources (numbers) to produce light that has a similar color/spectral distribution as natural daylight with a color temperature of approximately 6,500° K. Such filters may be used in accordance with the present disclosure to reduce eye strain for people playing slot machines.

Figure 10:
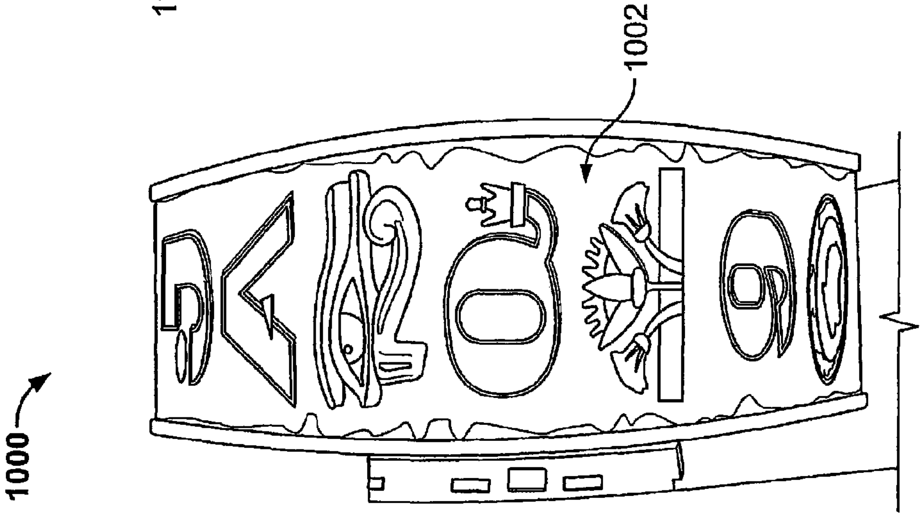
FIG. 10 is a front view of a slot machine reel according to an exemplary embodiment of the present disclosure.

FIG. 10 is a front view of a slot machine reel 1000 according to an exemplary embodiment of the present disclosure. Reel 1000 can include an desired number of game symbols 1002 of any desired configuration, e.g., a stylized "Q" as indicated.

Figure 11:
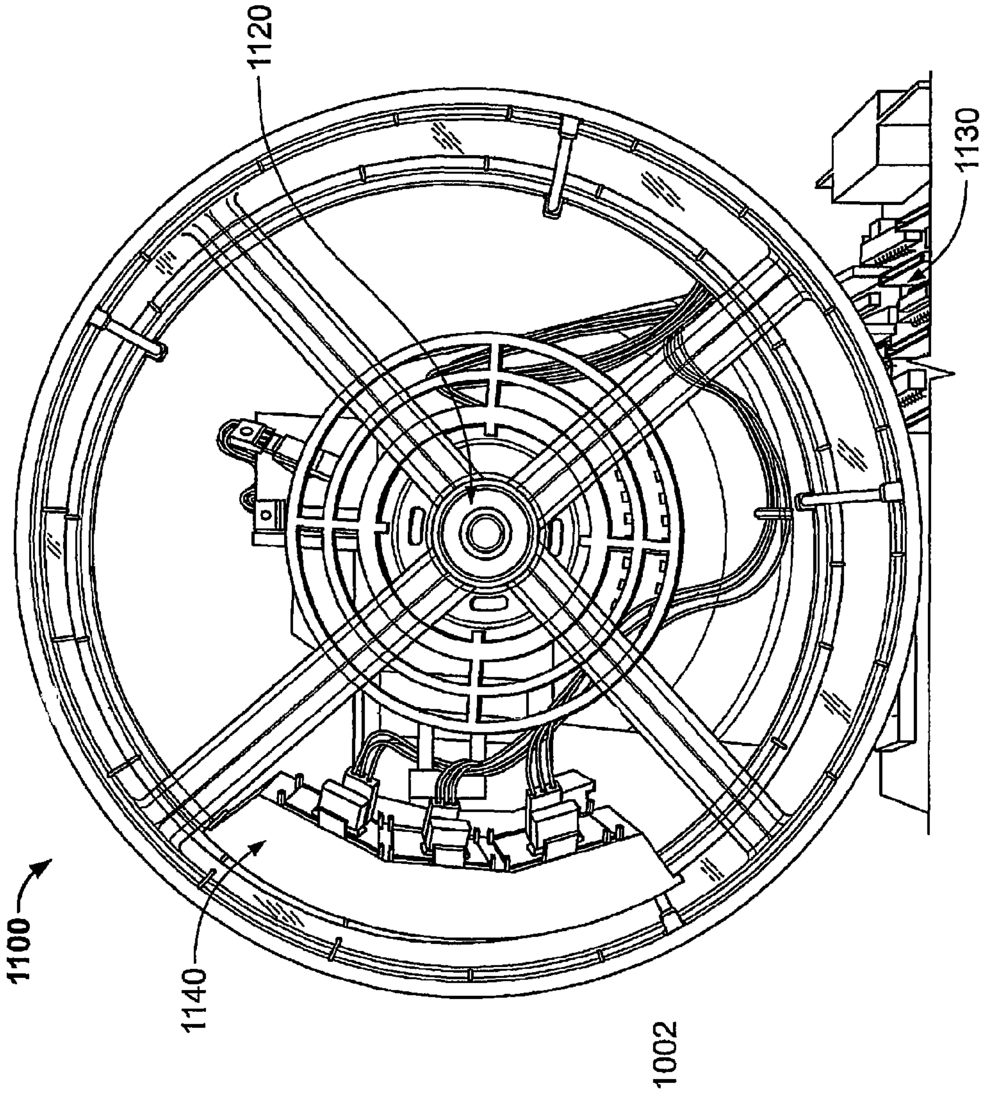
FIG. 11 is a side view of the slot machine reel of FIG. 10.

FIG. 11 is a side view of an exemplary slot machine reel 1100 according to the present disclosure Reel 1100 is shown with a motor, e.g., stepper motor 1120, that is configured and arranged to spin the reel 1100. A controller 1130 may be present to control the motion of the reel 1100, e.g., cause the reel 1100 to spin and stop at a position determined by a random number generator and/or other device.

Figure 12:
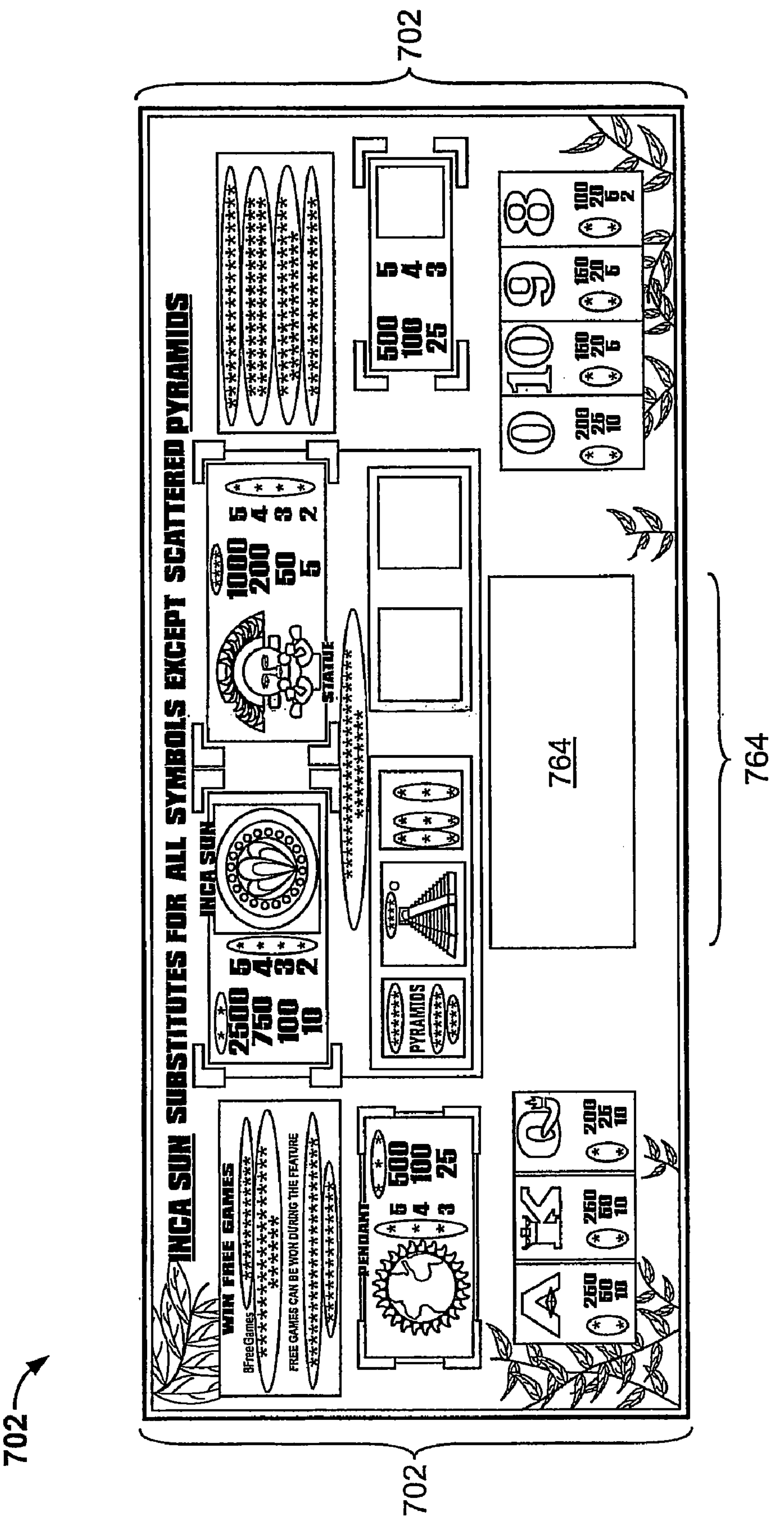
FIG. 12 is a front view of a viewing window with configurable lines according to a further embodiment of the present disclosure.

FIG. 12 is a front view of the upper portion 702 of FIG. 7 with a viewing window cutout 764 for configurable pay lines according to a further embodiment of the present disclosure. The cutout 764 can be configured and arranged for interchangeably receiving tapes or inserts having information about/corresponding to different pay lines.

Figure 13:
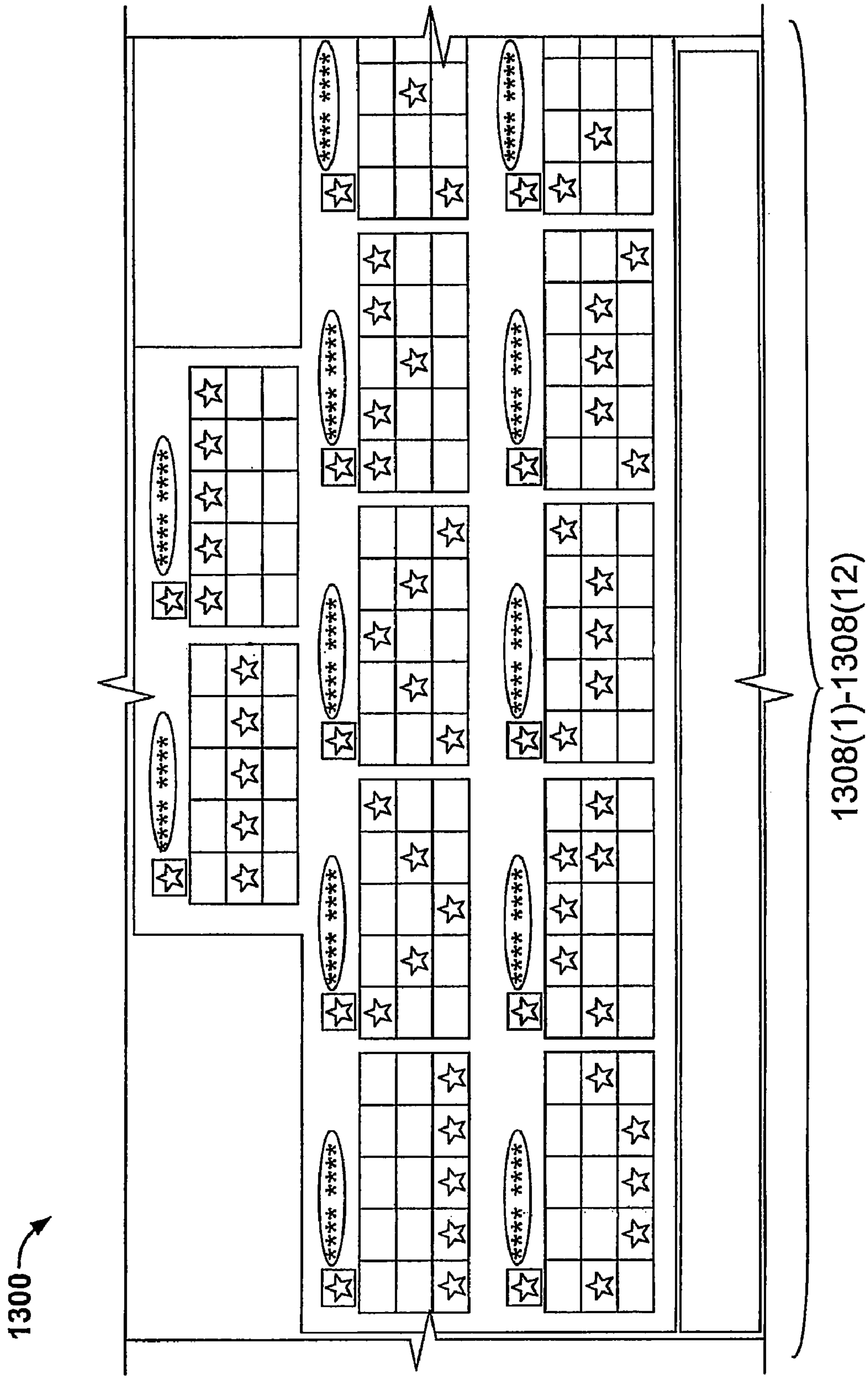
FIG. 13 is a front view of an embodiment of a tape insert suitable for the viewing window of FIG. 12 with pay line information according to a further embodiment of the present disclosure.

FIG. 13 is a front view of an embodiment of a tape insert 1300, suitable for the viewing window cutout 1204 of FIG. 12, with pay line information according to a further embodiment of the present disclosure. As shown the insert 1300 can include a desired number of indicated pay lines corresponding to different winning combinations 1308(1)-1308(12).

Figure 14:
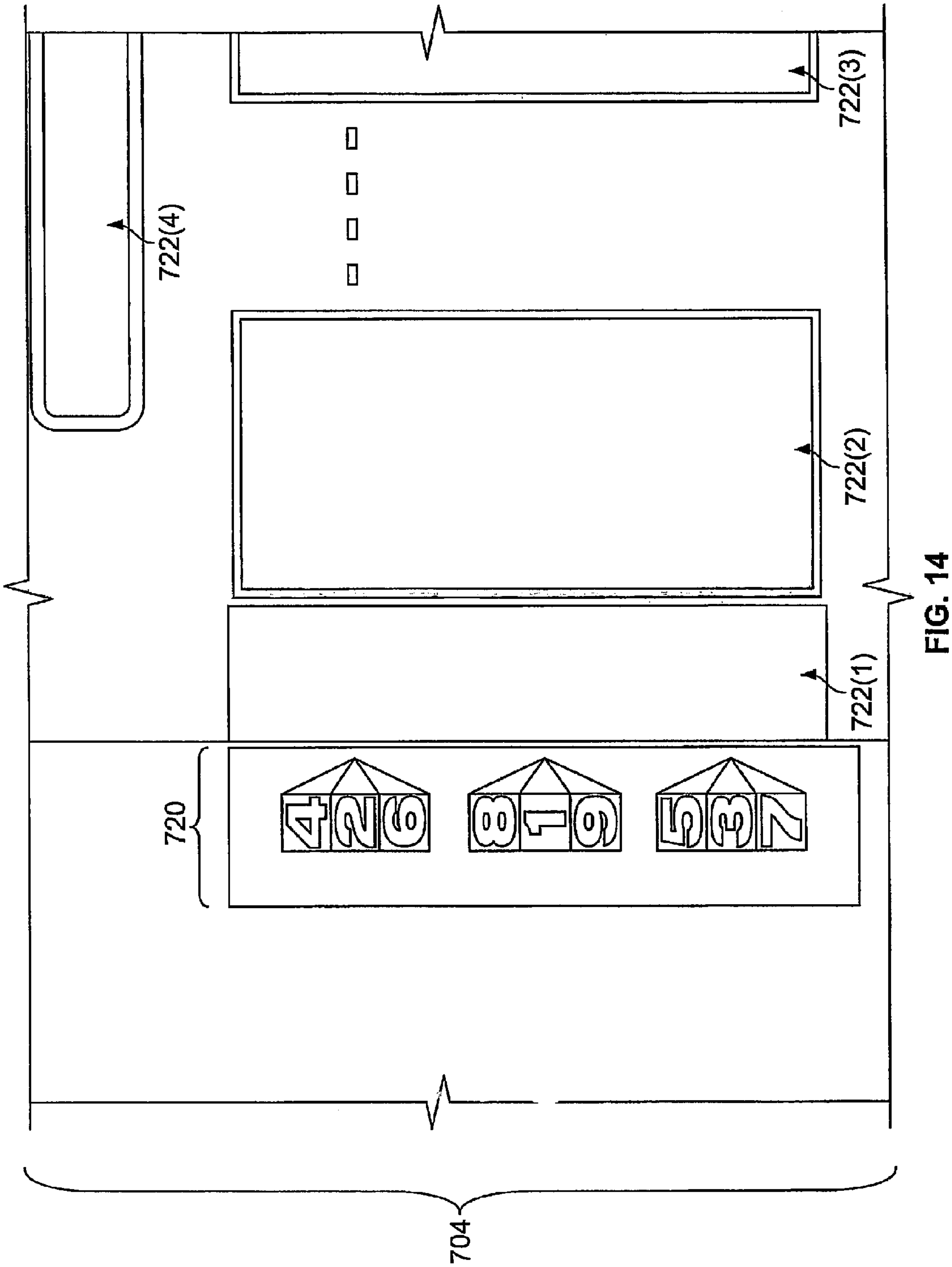
FIG. 14 shows a front view of a pay line tape and middle portion of glass viewing window of FIG. 13 with cutout.

FIGS. 14 shows a front view of a pay line tape 720 and middle portion 704 of slot machine 700 of FIG. 7 with cutouts 722(1)-722(4). Tape 720 with pay line information, e.g., vertical number listing "4, 2, 6, 8, 1, 9, 5, 3, 7," can be inserted in a cutout, e.g., 722(1) of the tape 720, and, if desired, subsequently removed and replaced.

Figure 15:
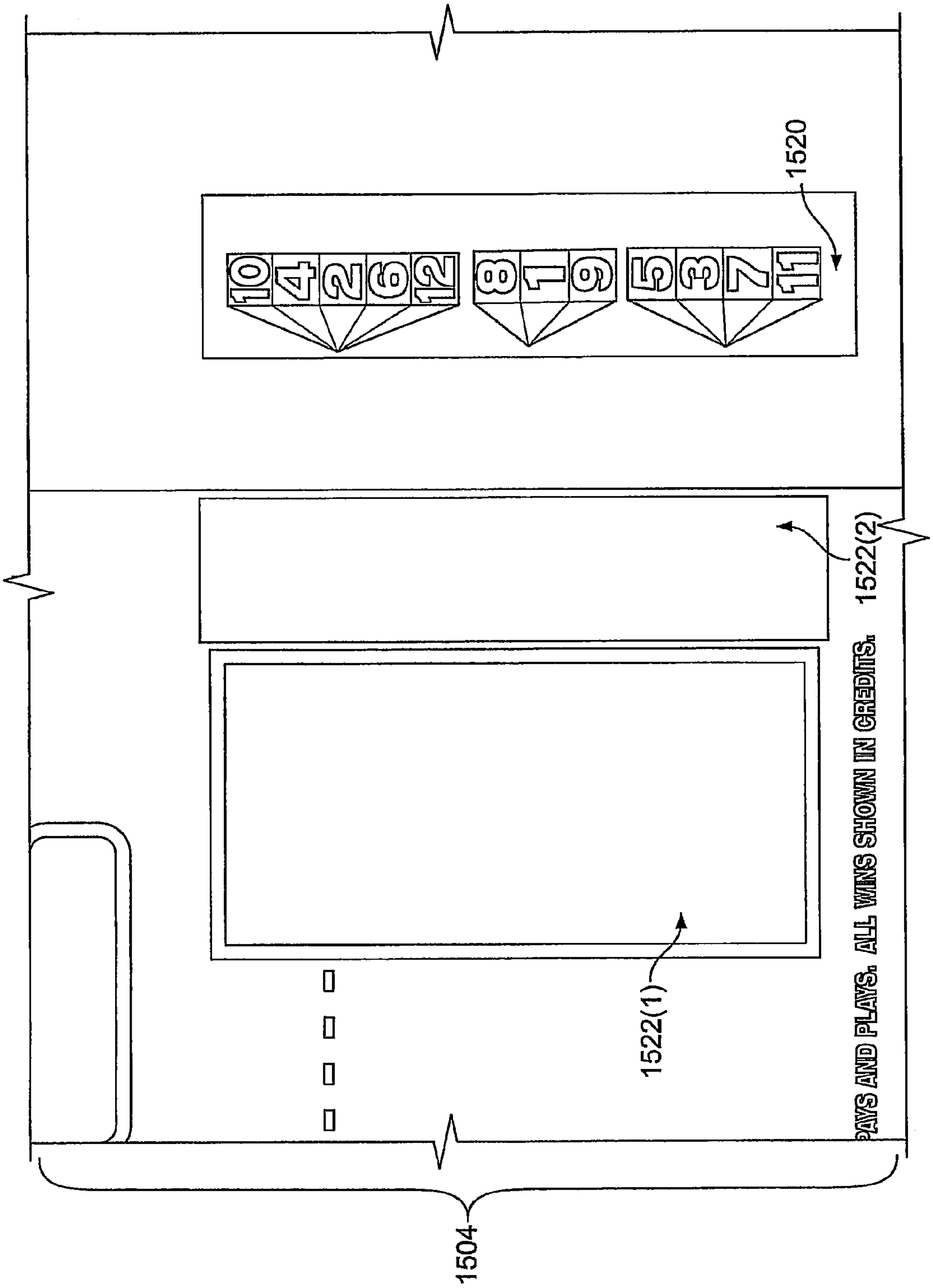
FIG. 15 shows another front view of a pay line tape and middle portion of glass viewing window of FIG. 13 with cutout.

FIG. 15 shows a front view of an alternate embodiment of a pay line tape 1520 and middle portion 1504 for use with a slot machine, e.g., machine 700, in accordance with the present disclosure. Insert 1520 can be received within one of multiple cutouts 1522(1)-1522(2). As shown, tape 1520 can include different information than that of FIG. 14, e.g., can include a listing "10, 4, 2, 6, 12, 8, 1, 9, 5, 3, 7, 11."

Figure 16:
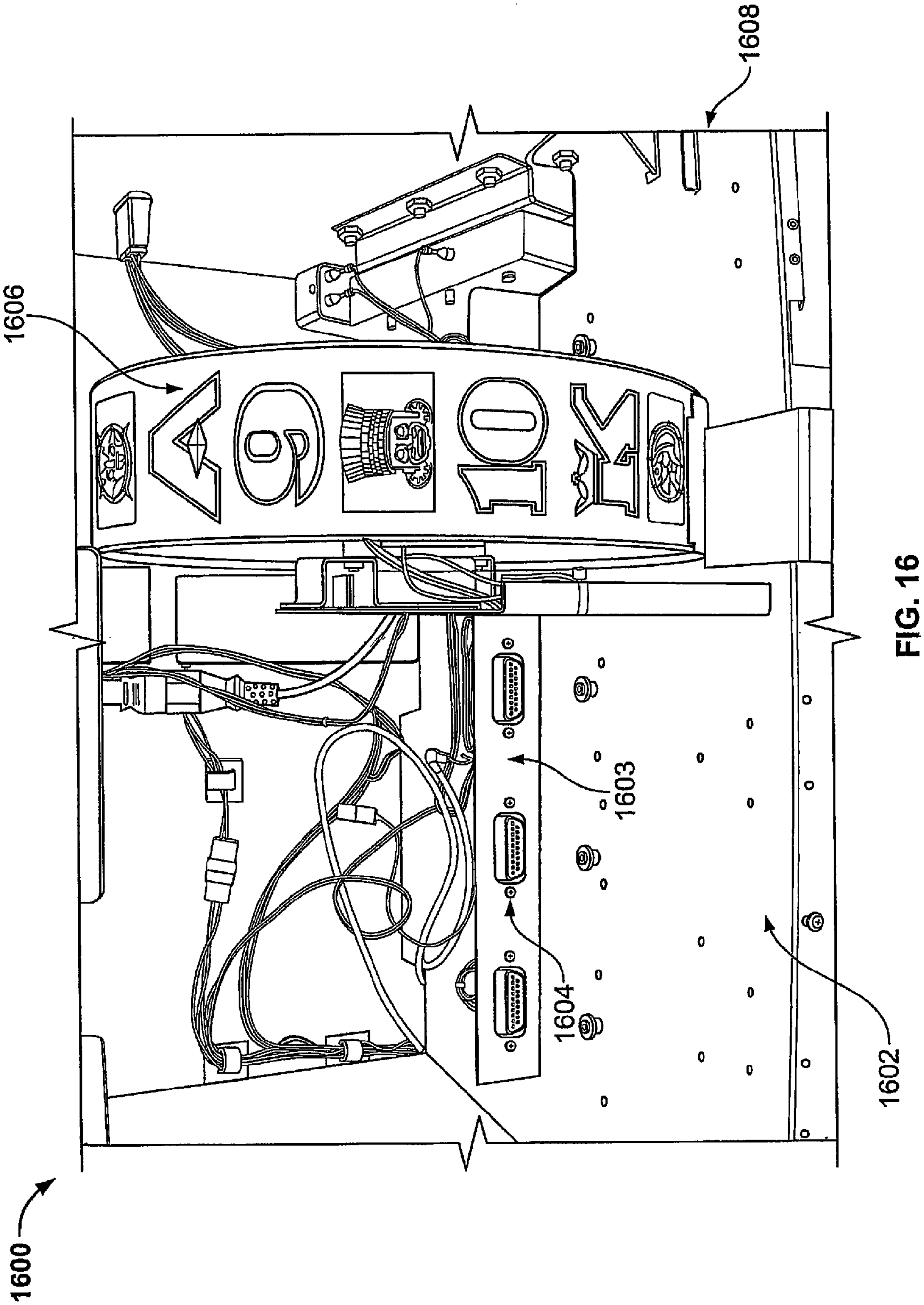
FIG. 16 is a front view of an exemplary embodiment of a slot machine configurable cabinet for receiving different numbers of reels according to the present disclosure.

FIG. 16 is a front view of an exemplary embodiment of a slot machine configurable reel shelf 1600 system for re-configurably securing a desired number of slot machine reels, e.g., 1606 according to the present disclosure. A reel shelf 1602 can be located in a slot machine cabinet 1608, as shown. The reel shelf 1602 can include a plurality of holes (or hole pairs) that are configured and arranged to receive fasteners, such as set screws, which can be utilized to hold a slot machine reel 1606. A reel, e.g., reel 1606, may be included with an associated reel module assembly, including supporting frame and associated motor. The shelf 1602 can also include a flange 1603 that includes a number of holes for electrical connectors 1604. Such connectors 1604 can be used to supply an electrical connection between each reel and an associated controller and/or monitoring system (not shown).

Figure 17:
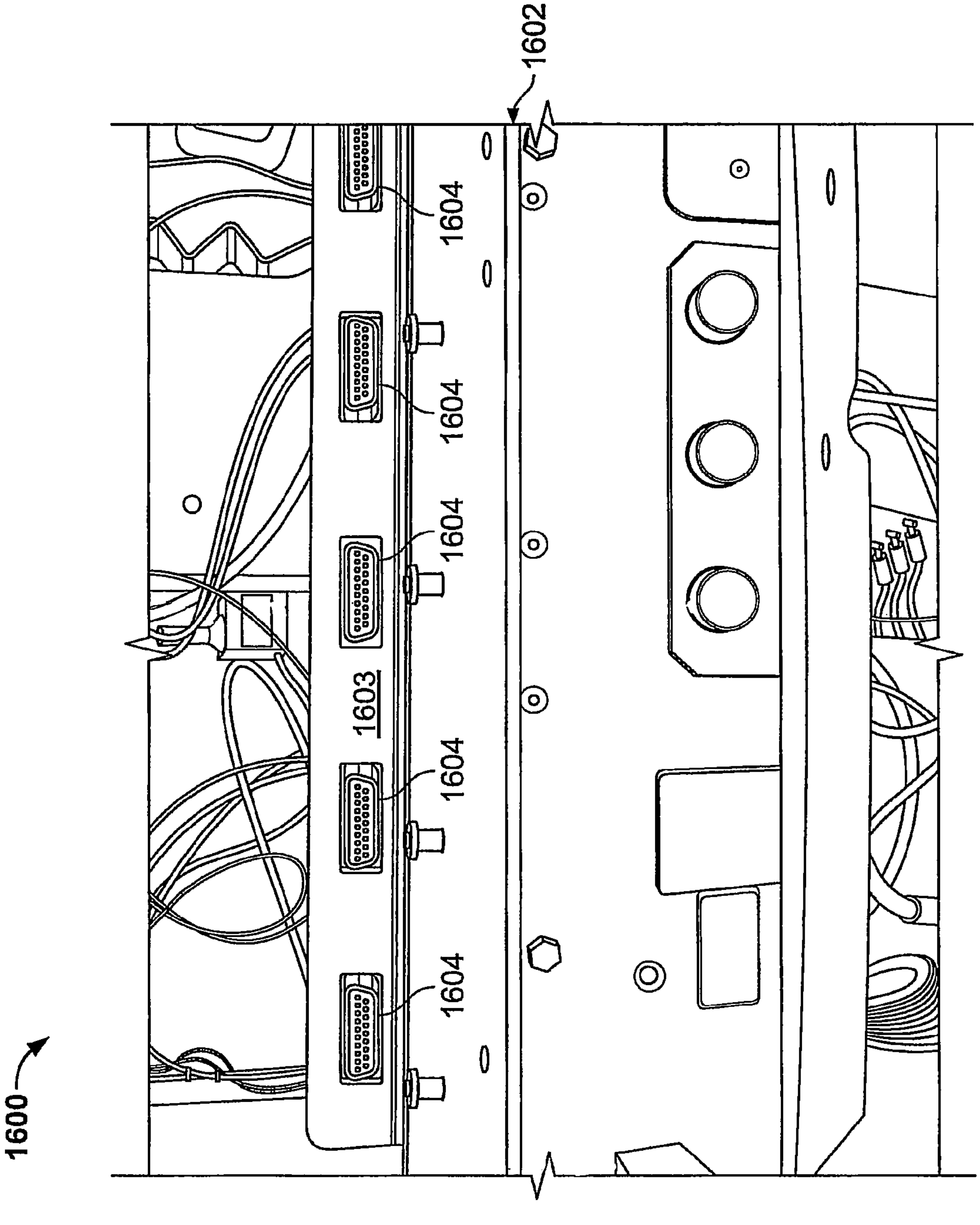
FIG. 17 is an enlarged portion of FIG. 16.
Figure 18:
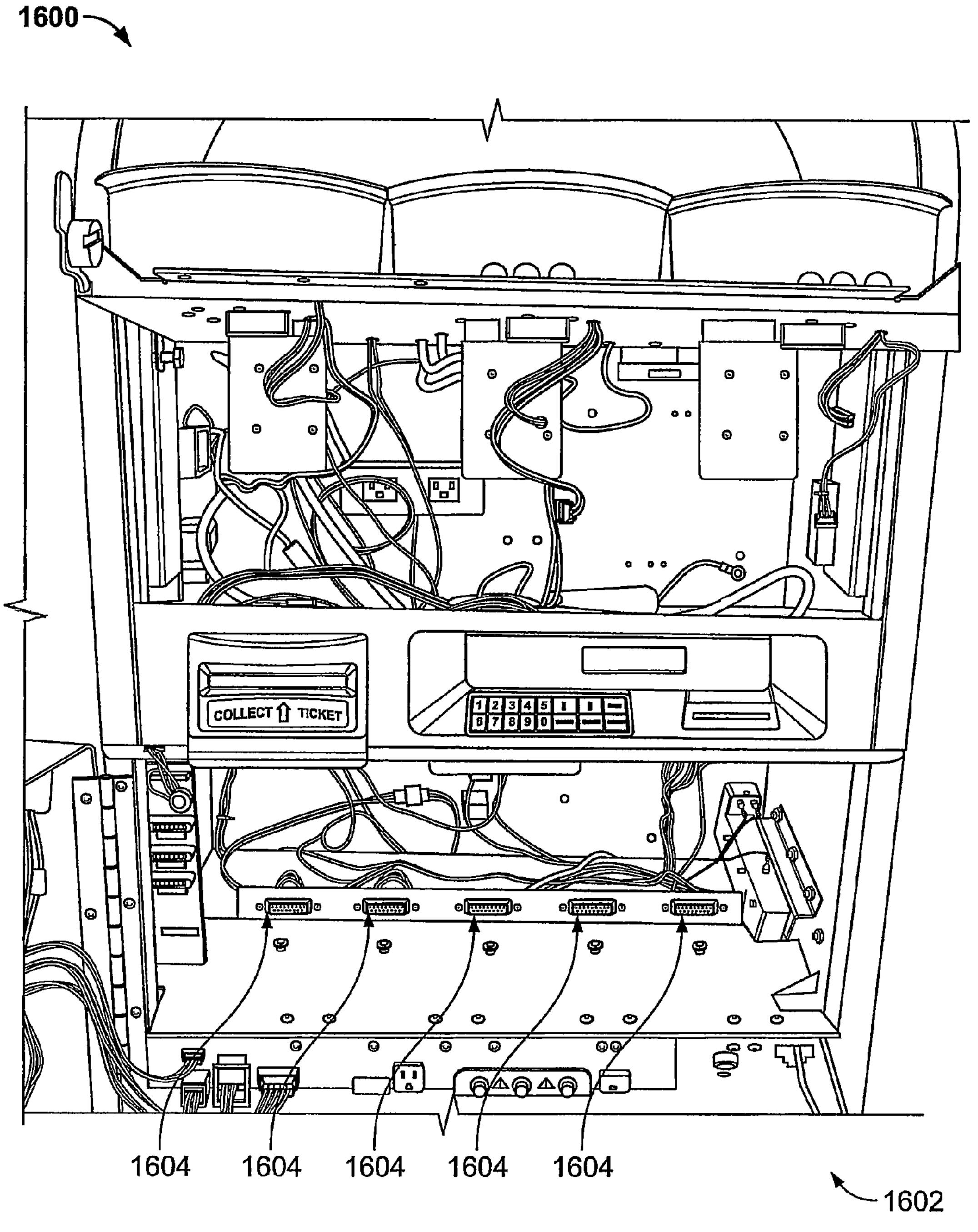
FIG. 18 is an enlarged portion of a system according to FIG. 16 without the reel.

FIG. 17 is an enlarged portion of FIG. 16 showing detail of the flange 1603 and electrical connector 1604 of reel shelf 1602. FIG. 18 is an enlarged portion of a reel shelf system 1600 according to FIG. 16 without the reel. Multiple connectors 1604 are shown in flange 1603 of the shelf 1602. While five connectors 1604 are shown, any desired number corresponding to reels located on the shelf 1602 may be present.

Figure 19:
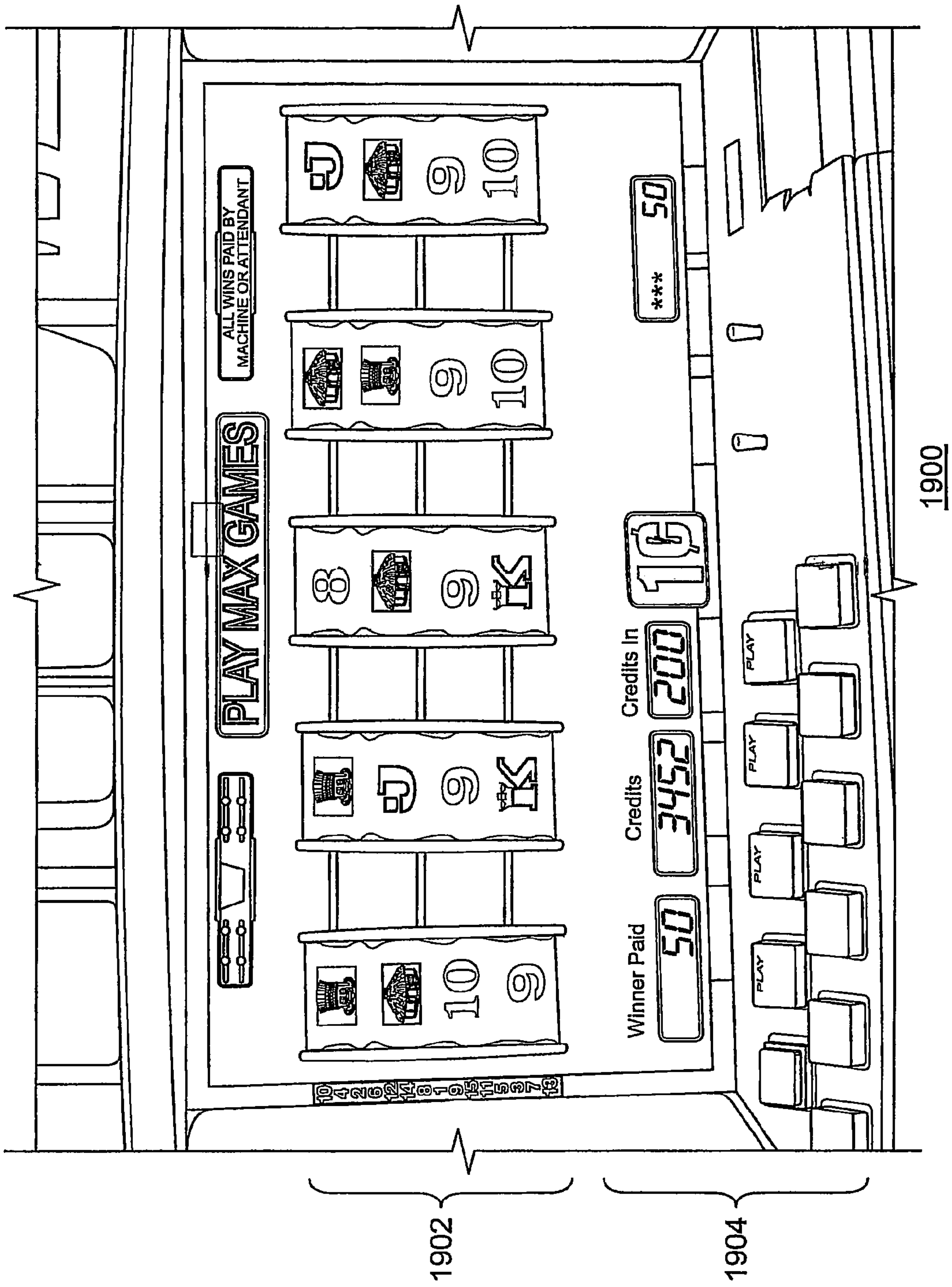
FIG. 19 is a front view of a slot machine system according to the present disclosure for identifying a winning combination/winning lines and prize information associated with a winning combination

FIG. 19 is a front view of a slot machine system 1900 according to the present disclosure for identifying a winning combination/winning lines and prize information associated with a winning combination. The system 1900 can be used for a slot machine that identifies a winning combination/winning lines and prize information associated with the winning combination.

As shown in FIG. 19, one or more light sources 1902, e.g., light emitting diodes, can be disposed behind positions of multiple slot machine reels to identify a winning combination 1903. User controls 1904, e.g., buttons for selecting/betting, are also shown.

In one embodiment, the winning combination may be identified by one or more light sources disposed behind desired display location of the one or more rotatable slot machine reels. In exemplary embodiments, for each winning combination of multiple winning combinations, the winning combination and its associated prize information can be displayed, e.g., sequentially.

Figure 20:
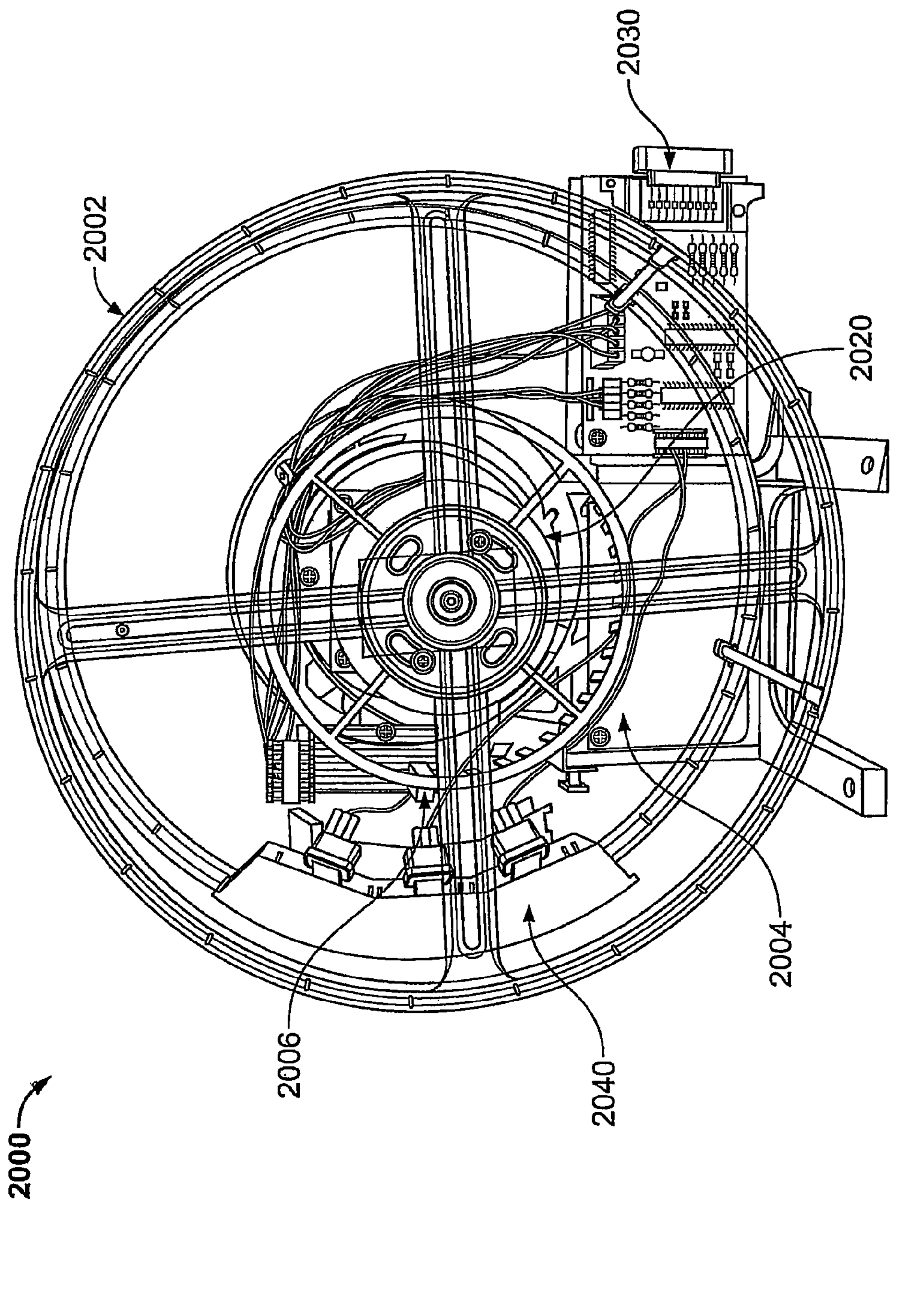
FIG. 20 is side view of a reel motion detection system according to the present disclosure.

FIG. 20 is side view of a reel motion detection system 2000 according to the present disclosure. System 2000 can be used on rotatable reel 2002 and includes a two or more circumferentially configured position markers 2004 (or encoding patterns) and two or more sensors or detectors 2006 that together can be used as location/motion detection encoders. The position markers 2004 can be configured over the entire angular range, e.g., 3600, of the reel 2002. Each detector 2006 can be mounted on a frame that is fixed, e.g., to underlying support shelf of a slot machine, and does not move during normal operation of the reel 2002.

With continued reference to FIG. 20, the detectors 2006 can be configured and arranged to produce an output waveform corresponding to motion of the position markers 2004. A stepper motor 2020 controlled by a controller 2030 operates to turn the reel 2020. One or more controllable light sources 2040 may be present to provide lighting effects for game symbols on an outer surface of the reel 2002. Such a system 2000 as shown can be used to detect reel tilt and motion of rotatable reels used in electromechanical slot machines. The sensors can be suitable optical sensors including an optical source, e.g., photodiode, and detector, e.g., photodiode, charge-coupled device (CCD), and the like.

Figures 26, 27:
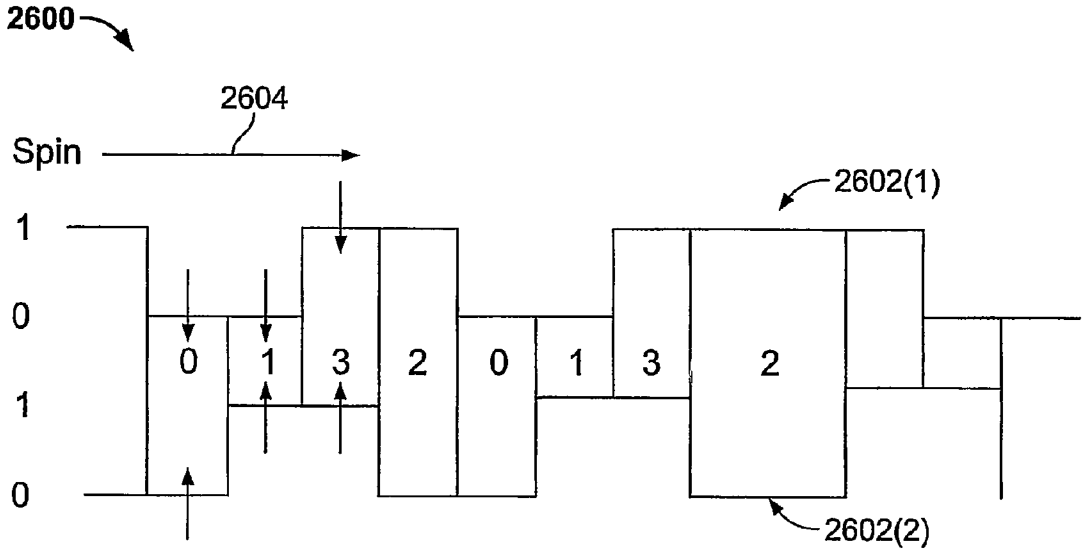
FIG. 26 is an example of the output waveform of a reel motion detection system according to the present disclosure.
FIG. 27 is an example of a logic table for adjusting, e.g., incrementing and decrementing, reel position values used for position/motion detection according to the present disclosure.

Because each associated marker (encoding pattern) 2004 and detector 2006 pair at a different angular position relative to the reel 2002, the system 2000 produces an output of two (or more) staggered waveform output that change with the rotation of the reel, for example, as shown and described for FIG. 26. By encoding the staggered sensor outputs, the direction of rotation and positioning of the reel 2002 can accurately be determined, and reel rotation can be distinguished from reel vibration. Consequently, reel vibrations can be differentiated from manipulations, e.g., fraudulent movement, of the reel.

Figure 21:
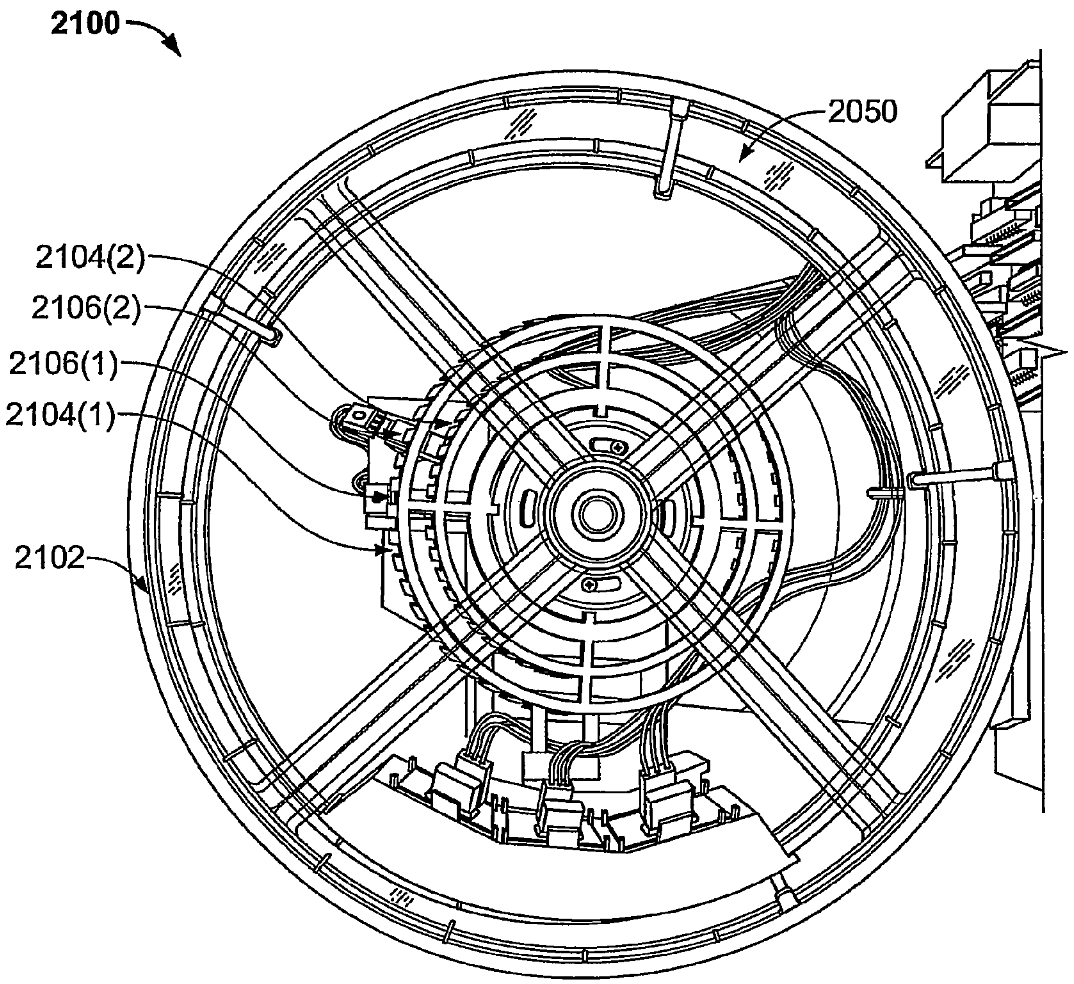
FIG. 21 is a perspective view of an alternate embodiment of a reel motion detection system according to the present disclosure.

FIG. 21 is a perspective view of an alternate embodiment of a reel motion detection system 2100 according to the present disclosure. As can be seen in FIG. 21, a circular frame attached to a rotatable slot machine reel 2102 can include two rings of circumferentially configured position markers 2104(1)-2104(2), which, in contrast with the embodiment of FIG. 20, have different radii. Detectors 2106(1)-2106(2) can be present and can operate to detect movement of the rings of position markers 2104(1)-2104(2). Gaming symbols 2150 are shown on an outer surface of reel 2102. Position markers 2104(1)-2104(2) and detectors 2106(1)-2106(2) can function as location/motion position encoders, producing staggered output waveforms when the reel rotates.

Figure 22:
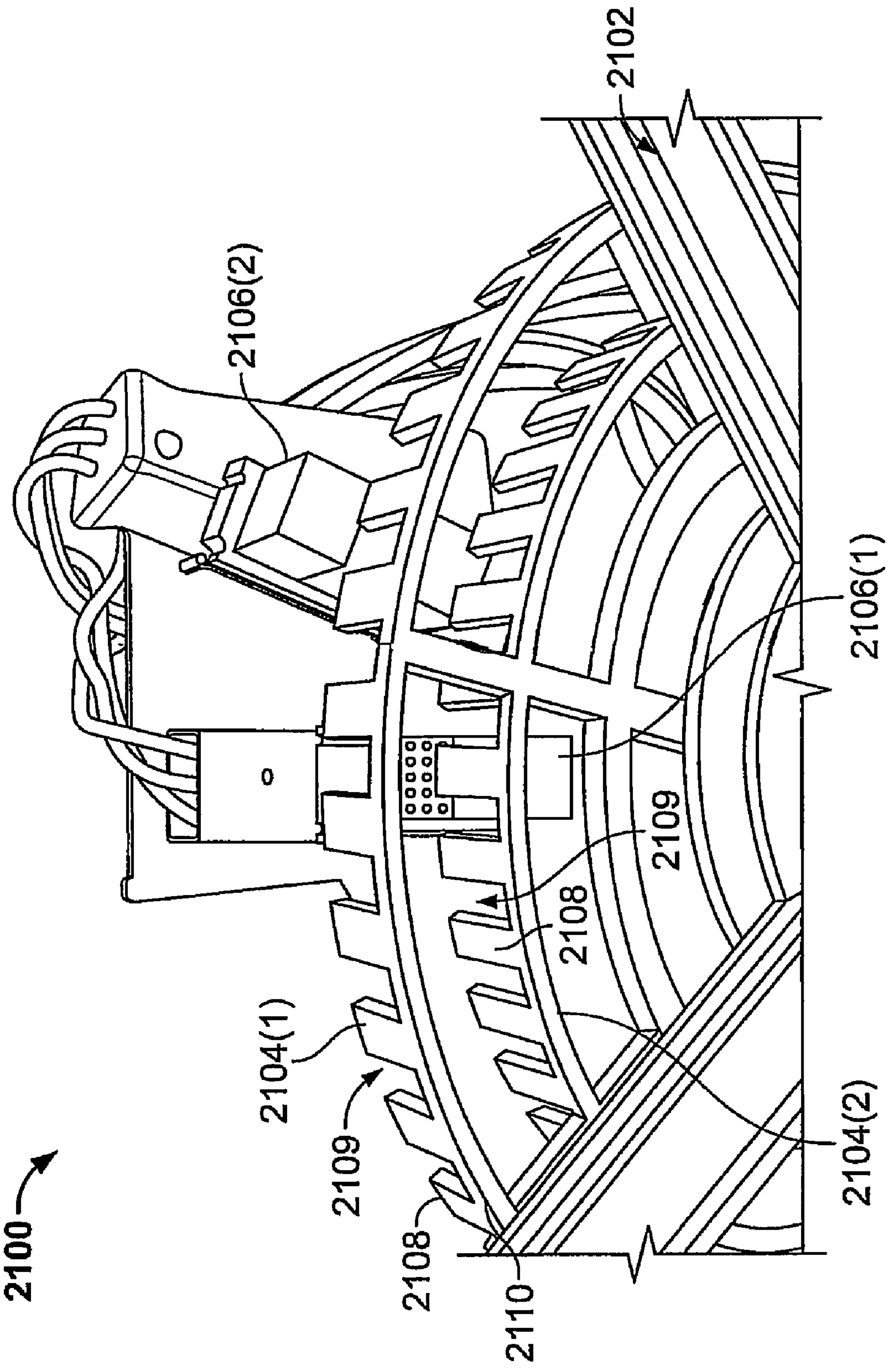
FIG. 22 is a close-up perspective view of the motion detection system of FIG. 21 showing detail of two location/motion detection encoders.
Figure 23:
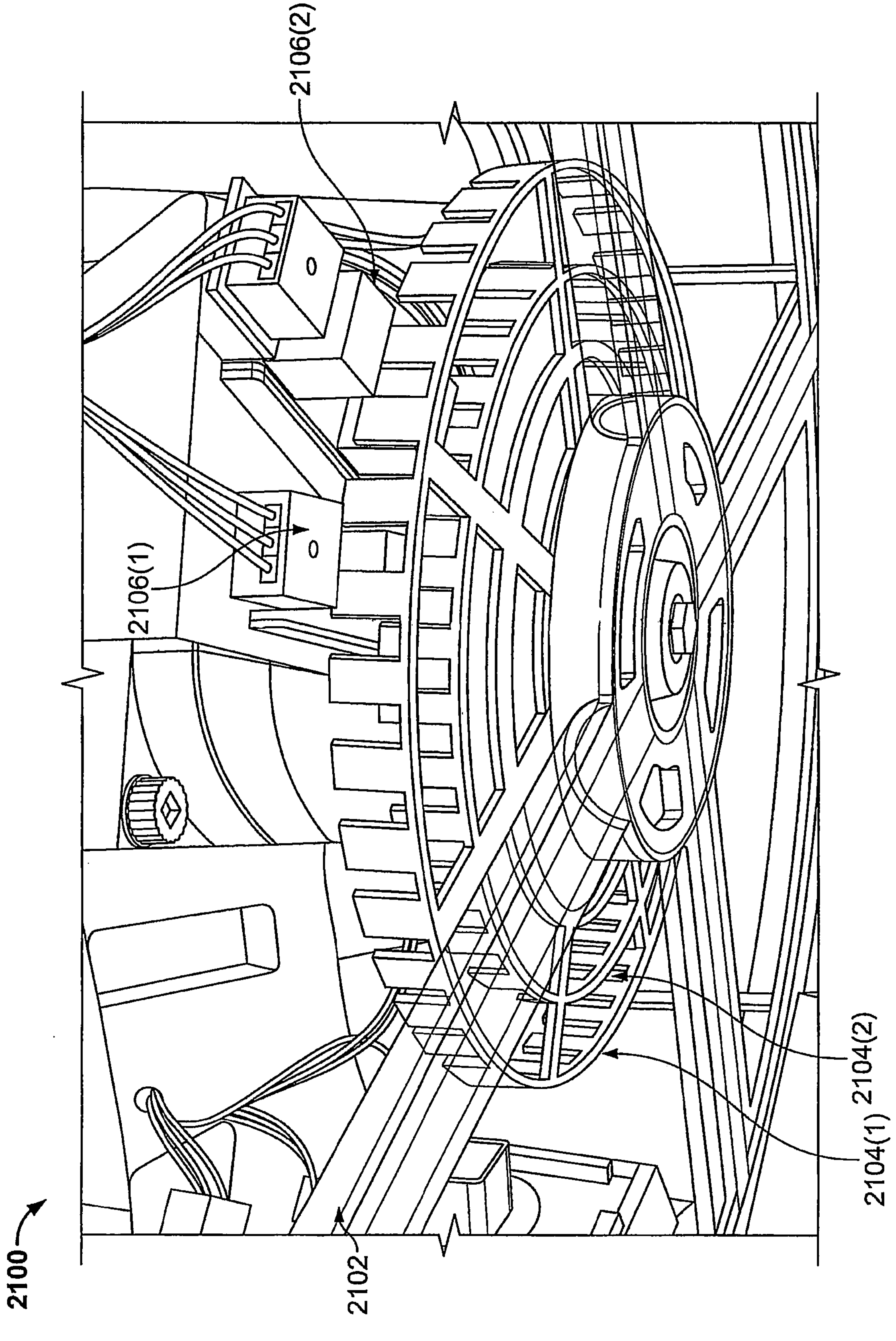
FIG. 23 is a further perspective view of the motion detection system of FIG. 22.

FIG. 22 is a close-up perspective view of the system 2100 of FIG. 21. Reel 2102 is shown having an attached frame 2110 that includes two rings of circumferentially/angularly configured position markers 2104(1)-2104(2). As, shown, the position markers 2104(1)-2104(2) can include a number of uniformly spaced elements, e.g., similar rectangular plates, 2108 that are separated by gaps 2109. FIG. 23 is a further close-up perspective view of system 2100 of FIGS. 21-22.

Figure 24:
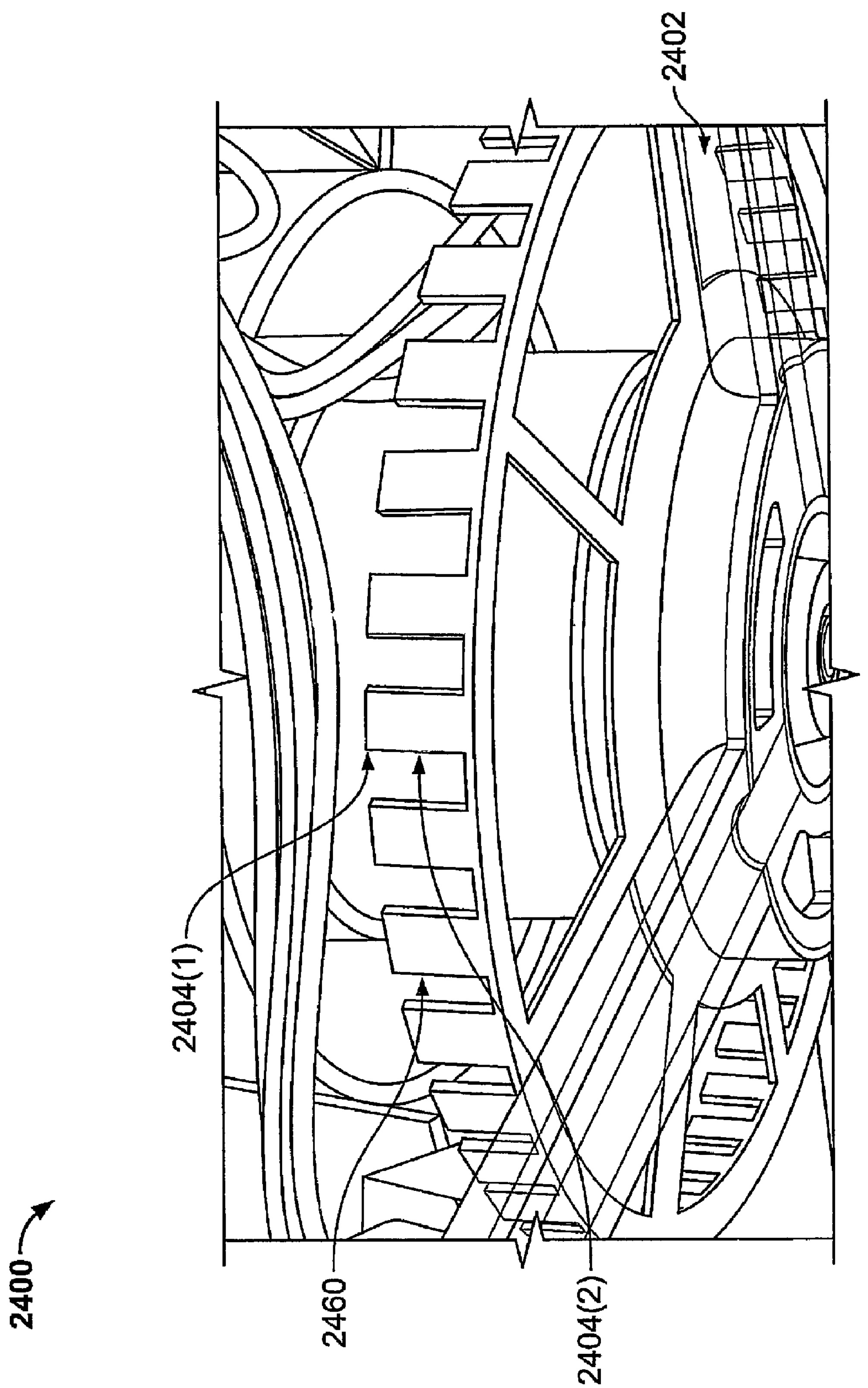
FIG. 24 is a perspective view of an exemplary embodiment of a reel motion detection system according to the present disclosure.

FIG. 24 is a perspective view of an exemplary embodiment of a reel motion detection system 2400 according to the present disclosure. A rotatable slot machine reel (indicated by frame 2402) can include two circumferentially configured position markers/encoding patterns 2404(1)-2404(2) that are configured adjacent to one another at substantially the same radius from the center of rotation of the reel but offset from one another as shown by the offset amount 2460. For such an embodiment, each marker, e.g., 2404(1), would have a corresponding detector (not shown) to form an operational location/motion position encoders. The offset 2460 can produce a corresponding offset or staggered configuration between the waveforms of the sensor outputs, as shown in FIG. 26.

Figure 25:
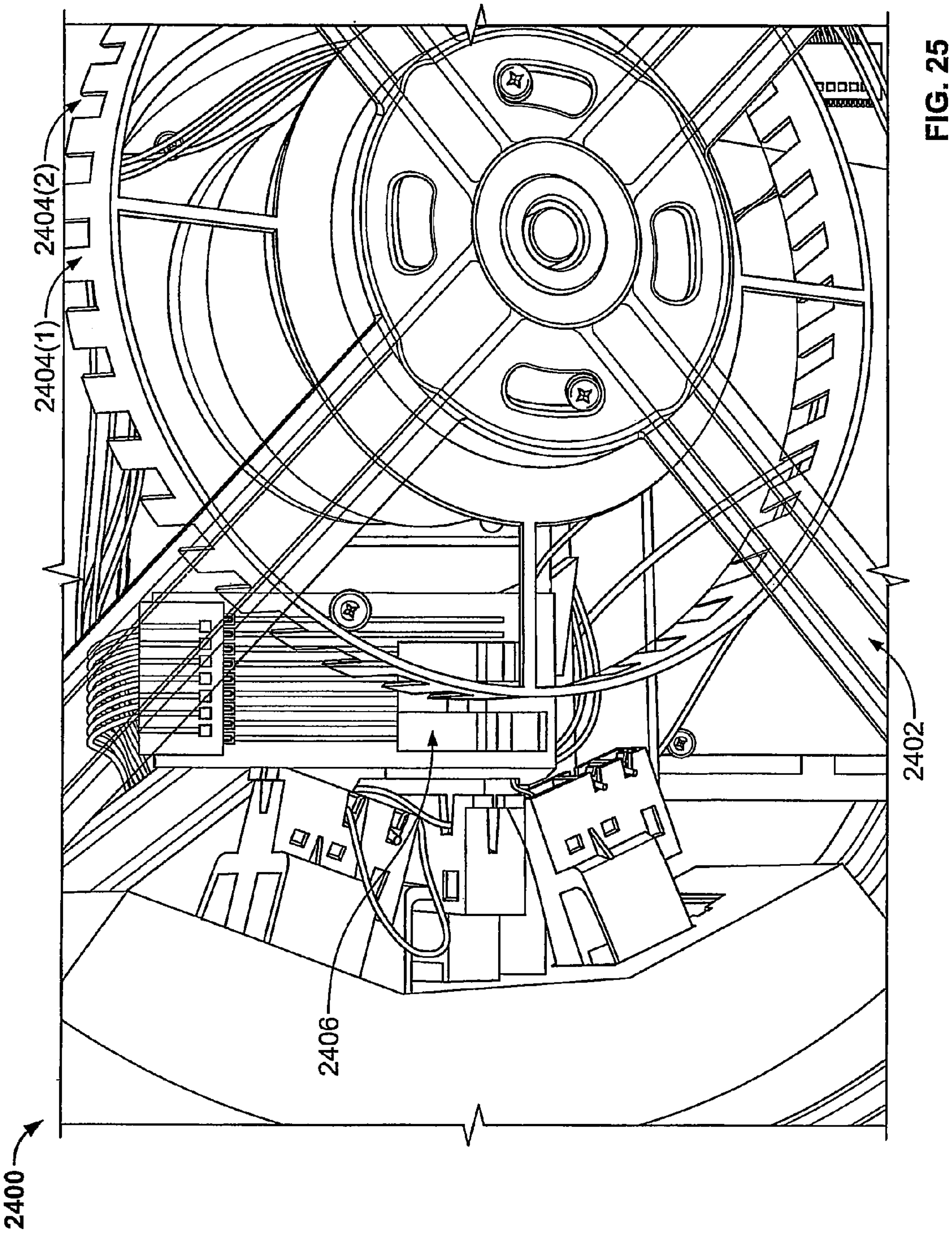
FIG. 25 is a further perspective side view of the system of FIG. 24.

FIG. 25 is a further perspective side view of the system of FIG. 24 showing a detector 2406 that is configured and arranged to detect motion of each of the marker 2402(1) and 2402(2).

FIG. 26 is a pictorial example of the sensor output waveforms 2602(1)-2602(2) that are offset and encoded according to an exemplary embodiment 2600 used with a reel motion detection system according to the present disclosure. Each output waveform is produced from the output signal produced by the respective associated encoder detector/sensor, e.g., detector 2204(1) in FIG. 22. As shown, each output waveform can transition from a high value, e.g., 1, to a low value, e.g., 0, and back again. The waveforms are shown as square waves but other suitable wave forms may be produced by the associated detectors and used for coding according the present disclosure. Additionally, while output values 0's and 1'a are indicated for a digital output, other suitable values, e.g., biased and/or scaled, may be used for encoding.

With continued reference to FIG. 26, a specific output sequence is encoded in or assigned to the output waveforms. In exemplary embodiments, a two-bit code having a specific output sequence, e.g., "01230132 . . . " for one spin direction, and "23102310 . . . " for the other spin direction may be used, as shown. The encoding of such a specific output sequence in the output waveforms allows a determination of the direction of spin of the associated rotating slot machine reel. The offset between the waveforms 2602(1)-2602(2) causes the waveforms to make transitions in states at different times. The timing/sequence of the transitions of the separate waveforms 2602(1)-2602(2) can be used to for position determination of the reel. For example, position values may be assigned to certain predetermined transitions based on the predetermined specific output sequence, and the position values may be used to increment and/or decrement position values/counters for determining the reel position.

FIG. 27 is an example of a logic table 2700 used in an exemplary embodiment for identifying transition states in sensor output waveforms in accordance with the present disclosure. A. shown, the table 2700 can include values of a specific output sequence used for encoding according, e.g., the number values of the specific output sequence "01320 132 . . . " of FIG. 26. In the table, desired values can be assigned to the various identified transitions of the sensor output waveforms.

A logic table such as shown in FIG. 27, can be used according to the present disclosure for adjusting a position indication value, e.g., as stored in a counter or memory device, that corresponds to a position of the associated reel. For example, as shown, in response to identifying a first predetermined transition a position value may be assigned a +1 value (incremented). Likewise, a position indication value corresponding to a position of the associated reel in response may be assigned a different value, e.g., −1 corresponding and decreased, in response to identifying a second predetermined transition. For other values, e.g., 99 as shown, a present position indication value corresponding to a position of the associated reel can be maintained or not adjusted. This could be the case when the indicated value on the logic table 2700 has been assigned to an unallowed or dummy transition.

Figure 28:
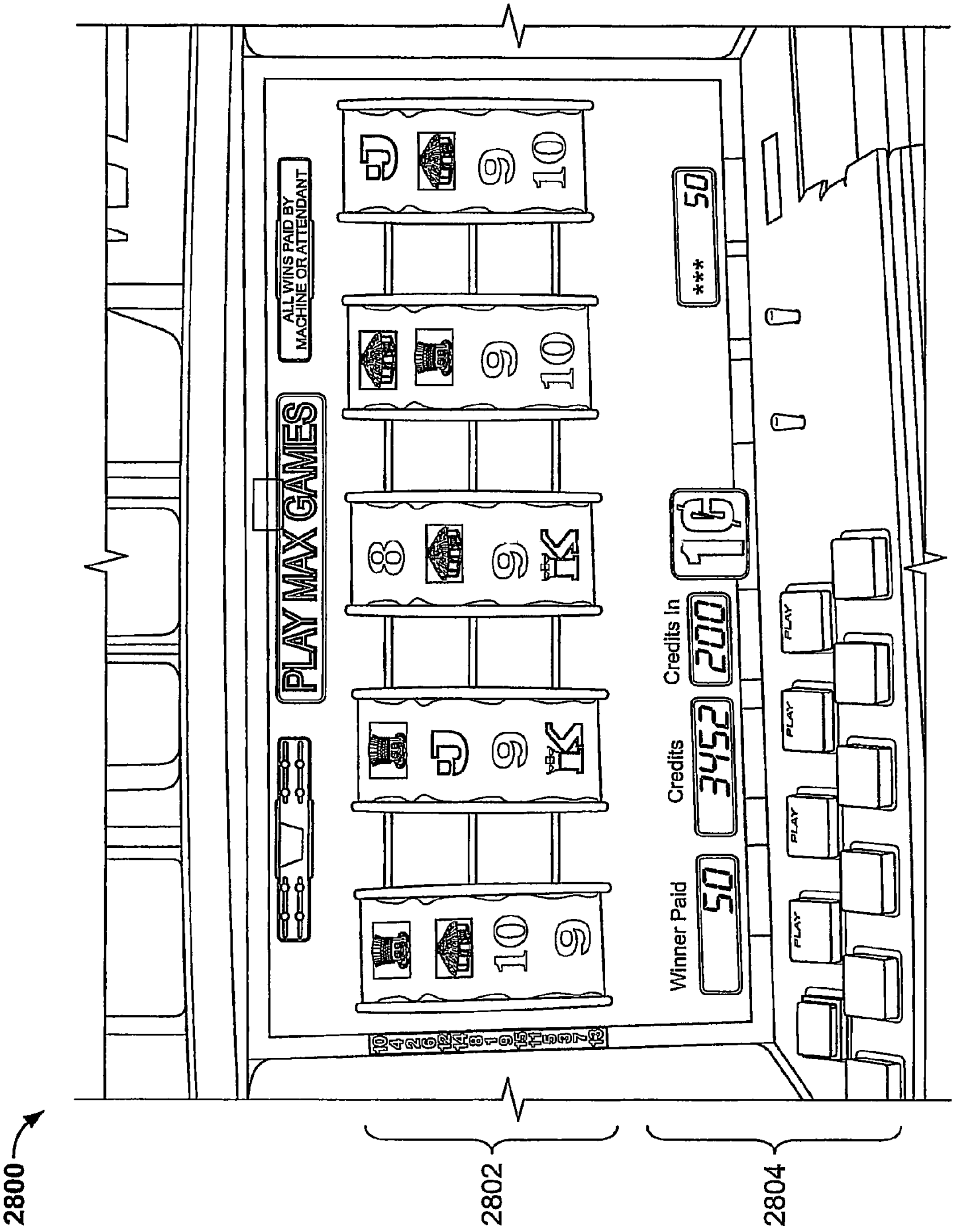
FIG. 28 is a front view of a slot machine reel wins display according to the present disclosure.

FIG. 28 is a front view of a slot machine reel wins display 2800 according to the present disclosure. A slot machine can include a reel with game symbols. The slot machine can include a suitable motor such as a stepper motor for spinning the reel. In an exemplary embodiment, one or more light sources 2802 are disposed behind the reel relative to a player/user location in front of the slot machine. The one or more light sources can be configured and arranged to controllably illuminate a betting pattern that a player has purchased. User controls 2804 can be present, similar to the embodiment shown for FIG. 19.

Further embodiments of the present disclosure can provide slot machine reel stop systems, methods, and apparatus useful for electromechanical slot machines. Prior art slot machine step-motor drive systems typically utilize timers to spin all of the reels simultaneously. For example, a 3-reel or 5-reel system could use motors with 100 steps per revolution and a software timer of 10 mS. Every time the timer hits (usually accomplished by firing off an interrupt), the control program can instruct the motor control hardware to step each reel 1 step. This would result in each reel completing a revolution in 100*10 mS=1 S, meaning the reels will spin once per second or 60 times per minute, giving a speed of 60 RPM. (Due to the physics of reel mechanisms, other factors such as ramp-up and ramp-down timing are required, so finer resolutions are usually necessary in order to assure smooth starting and stopping of the reels. Also, actual speeds are typically above 100 RPM.) The net effect is that all reels spin at the same speed, and since the starting and stopping positions for each reel are essentially random for each spin, the reels may start at the same time (or in a cascade), but they stop at extremely irregular intervals. Most slot machines stop the reels in a left-to-right pattern, and the only control available to insure that is by adding complete extra revolutions to each reel in sequence. Typical slot machine design also adds additional revolutions to some reels in order to make sure that each reel stops sufficiently after the previous reel (at least one complete revolution later). When video slot machines were developed, it was simple to instead have each reel stop in sequence a precise time after the prior reel, since all of the video reel stops are arbitrarily displayed and therefore can stop whenever they need to. This creates a pleasant rhythmic stopping effect, which is more pronounced with more reels (such as the current 5-reel standard). Mechanical reels using the same speed for each reel cannot duplicate this effect. However, by changing the timing system such that each mechanical reel's speed is unique, the same rhythmic stopping can be achieved.

One embodiment of a method according to the present disclosure includes use of a shorter timer, and can include setting each reel to step once every ×times (for example, with a 1 mS timer, one reel could be set to step every 11 mS and one could step every 13 mS, giving speeds of 66 RPM and 78 RPM respectively). Alternatively, each reel could utilize its own timer of ×mS and step once for each timer. In any case, it is not difficult to calculate the required speed for each reel by working backwards from the desired stop and start for each reel. The speed variation preferably will not be substantially noticeable to a player, while the rhythmic stopping will be. Further refinement can be achieved in the case of a particularly large variation in speeds by simply adding one revolution to all reels, giving a larger time to equalize the speeds.

While certain embodiments have been described herein, it will be understood by one skilled in the art that the methods, systems, and apparatus of the present disclosure may be embodied in other specific forms without departing from the spirit thereof. For example, while the motors for rotating reels have been described as being of the stepper type, other suitable motor may be used instead or in addition to such stepper motors.

The embodiments described herein are accordingly to be considered in all respects as illustrative of the present disclosure and not restrictive.

The invention claimed is:

1. An electromechanical slot machine with back lighting, the slot machine comprising:

a cabinet having upper, middle, and lower portions;

a display mounted to the upper portion of the cabinet for displaying information related to winning symbol combinations, the display comprising an updatable portion for receiving dynamic information indicative of configurable winning symbol combinations available for game play, wherein at least one of the displayed winning symbol combinations includes a pattern of symbols on different pay lines;

a plurality of rotatable reels rotatably supported in the middle portions of the cabinet, wherein game symbols are disposed on an outer surface of each reel;

a motor supported in the cabinet and configured and arranged to rotate each reel; and a plurality of controlled light sources, one or more of which are disposed behind a visible surface of a respective reel in the middle portion of the cabinet to illuminate one or more symbols on the respective reels, wherein the controlled light sources selectively illuminate the symbols based on the configurable winning pattern combinations available for game play that are indicated on the updatable portion of the display.

2. The slot machine of claim 1, wherein each light source is a lamp.

3. The slot machine of claim 1, wherein each of the plurality of controlled lighting sources is a light emitting diode.

4. The slot machine of claim 1, further comprising an electronic controller configured to control the illumination of the plurality of controlled light sources.

5. The slot machine of claim 1, further comprising a switch configured and arranged to control power supplied to the plurality of controlled light sources.

6. The slot machine of claim 1 wherein the plurality of rotatable reels include a translucent material.

7. The slot machine of claim 1 wherein the game symbols include a translucent material.

8. The slot machine of claim 7, wherein the plurality of rotatable reels include an opaque material outside of an area of the game symbols.

9. A method of operating a slot machine, the method comprising:

displaying information related to winning symbol combinations at a display of a cabinet, the display comprising an updatable portion for receiving dynamic information indicative of configurable winning symbol combinations available for game play, wherein at least one of the displayed configurable winning symbol combinations includes a pattern having symbols on different pay lines;

placing one or more controlled light sources behind individual symbols of a plurality of mechanical rotatable slot machine reels; and selectively highlighting one or more game symbols on the plurality of slot machine reels by activating the respective controlled light sources, wherein the selective highlighting is based on the configurable winning pattern combinations available for game play indicated at the updatable portion of the display.

10. The method claim 9, further comprising turning on one or more or the controlled light sources when one or more of the slot machine reels is moving.

11. The method of claim 9, further comprising operating a switch configured and arranged to control power to one or more of the light sources during operation.

* * * * *

UNITED STATES PATENT AND TRADEMARK OFFICE

CERTIFICATE OF CORRECTION

PATENT NO. : 8,388,433 B2
APPLICATION NO. : 12/193275
DATED : March 5, 2013
INVENTOR(S) : Scott Stewart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 879 days.

Signed and Sealed this
Thirtieth Day of December, 2014

Michelle K. Lee
*Deputy Director of the United States Patent and Trademark Office*